(12) United States Patent
Shi et al.

(10) Patent No.: US 11,491,487 B2
(45) Date of Patent: Nov. 8, 2022

(54) DEVICES AND METHODS FOR MEASURING ANALYTES AND TARGET PARTICLES

(71) Applicant: CYTOCHIP INC., Irvine, CA (US)

(72) Inventors: Wendian Shi, Irvine, CA (US); Yuzhe Ding, Irvine, CA (US); Yuan Gao, Irvine, CA (US)

(73) Assignee: CytoChip Inc., Irvine, CA (US)

( * ) Notice: Subject to any disclaimer, the term of this patent is extended or adjusted under 35 U.S.C. 154(b) by 204 days.

(21) Appl. No.: 16/758,800

(22) PCT Filed: Oct. 19, 2018

(86) PCT No.: PCT/US2018/056725
§ 371 (c)(1),
(2) Date: Apr. 23, 2020

(87) PCT Pub. No.: WO2019/083844
PCT Pub. Date: May 2, 2019

(65) Prior Publication Data
US 2020/0316599 A1 Oct. 8, 2020

Related U.S. Application Data

(60) Provisional application No. 62/575,918, filed on Oct. 23, 2017.

(51) Int. Cl.
*G01N 3/00* (2006.01)
*G01N 15/14* (2006.01)
(Continued)

(52) U.S. Cl.
CPC .... *B01L 3/502761* (2013.01); *G01N 15/1459* (2013.01); *G01N 15/1484* (2013.01); *B01L 2200/0684* (2013.01)

(58) Field of Classification Search
None
See application file for complete search history.

(56) References Cited

U.S. PATENT DOCUMENTS

| 4,895,500 A | 1/1990 | Hok |
| 4,983,523 A | 1/1991 | Li |

(Continued)

FOREIGN PATENT DOCUMENTS

| WO | 1999/033559 A1 | 7/1999 |
| WO | 2005/026665 A2 | 3/2005 |

(Continued)

OTHER PUBLICATIONS

PCT Application No. PCT/US2018/037114, International Preliminary Report on Patentability, dated Dec. 17, 2019, 9 pages.

(Continued)

*Primary Examiner* — Matthew D Krcha
*Assistant Examiner* — Brittany I Fisher
(74) *Attorney, Agent, or Firm* — Avek IP, LLC

(57) ABSTRACT

Devices and methods for measuring analytes and target particles in a sample are disclosed. In some embodiments, the disclosure provides a cartridge device. In other embodiments, the disclosure provides a method of using a cartridge device as disclosed herein for analyzing analytes and target particles in a sample. In further embodiments, the disclosure provides an analyzer including a cartridge device and a control unit device. The control unit device is configured to receive, operate, and/or actuate the cartridge device. In some embodiments, the disclosure provides a method of using an analyzer as disclosed herein for analyzing analytes and target particles in a sample.

19 Claims, 17 Drawing Sheets

(51) Int. Cl.
*G01N 15/00* (2006.01)
*G01N 15/06* (2006.01)
*G01N 15/10* (2006.01)
*B01L 3/00* (2006.01)

(56) References Cited

U.S. PATENT DOCUMENTS

| | | |
|---|---|---|
| 5,096,669 A | 3/1992 | Lauks |
| 5,110,724 A | 5/1992 | Hewett |
| 5,213,965 A | 5/1993 | Jones |
| 5,409,665 A | 4/1995 | Burd |
| 5,478,750 A | 12/1995 | Bernstein |
| 5,591,643 A | 1/1997 | Schembri |
| 6,033,631 A | 3/2000 | Zuckermann |
| 6,100,084 A | 8/2000 | Miles |
| 6,369,893 B1 | 4/2002 | Christel |
| 6,382,228 B1 | 5/2002 | Cabuz |
| 6,549,275 B1 | 4/2003 | Cabuz |
| 6,664,110 B1 | 12/2003 | Tsuji |
| 6,750,060 B2 | 6/2004 | Ozasa |
| 6,752,961 B2 | 6/2004 | Kopf-Sill |
| 6,804,984 B2 | 10/2004 | Shibata |
| 7,016,022 B2 | 3/2006 | Fritz |
| 7,061,595 B2 | 6/2006 | Cabuz |
| 7,113,266 B1 | 9/2006 | Wells |
| 7,130,046 B2 | 10/2006 | Fritz |
| 7,172,897 B2 | 2/2007 | Blackburn |
| 7,215,425 B2 | 5/2007 | Rezachek |
| 7,220,595 B2 | 5/2007 | Nugent |
| 7,318,900 B2 | 1/2008 | DeMarco |
| 7,328,722 B2 | 2/2008 | Rich |
| 7,420,659 B1 | 9/2008 | Cabuz |
| 7,471,394 B2 | 12/2008 | Padmanabhan |
| 7,521,243 B2 | 4/2009 | Lindberg |
| 7,534,331 B2 | 5/2009 | Kayyem |
| 7,553,453 B2 | 6/2009 | Gu |
| 7,580,120 B2 | 8/2009 | Hamada |
| 7,595,169 B2 | 9/2009 | Swaim |
| 7,632,462 B2 | 12/2009 | Holtlund |
| 7,641,856 B2 | 1/2010 | Padmanabhan |
| 7,760,351 B2 | 7/2010 | Cox |
| 7,771,658 B2 | 8/2010 | Larsen |
| 7,800,742 B2 | 9/2010 | Fukuda |
| 7,832,429 B2 | 11/2010 | Young |
| 7,842,234 B2 | 11/2010 | Lauks |
| 7,843,563 B2 | 11/2010 | Fritz |
| 7,863,035 B2 | 1/2011 | Clemens |
| 7,894,047 B2 | 2/2011 | Hamada |
| 7,910,062 B2 | 3/2011 | Yu |
| 8,029,746 B2 | 10/2011 | Yu |
| 8,034,296 B2 | 10/2011 | Cox |
| 8,071,051 B2 | 12/2011 | Padmanabhan |
| 8,097,225 B2 | 1/2012 | Padmanabhan |
| 8,124,024 B2 | 2/2012 | Ching |
| 8,168,443 B2 | 5/2012 | Yu |
| 8,202,492 B2 | 6/2012 | Linder |
| 8,283,177 B2 | 10/2012 | Ball |
| 8,293,175 B2 | 10/2012 | Holtlund |
| 8,361,410 B2 | 1/2013 | Padmanabhan |
| 8,367,023 B2 | 2/2013 | Bae |
| 8,383,043 B2 | 2/2013 | Padmanabhan |
| 8,518,328 B2 | 8/2013 | Padmanabhan |
| 8,540,946 B2 | 9/2013 | Padmanabhan |
| 8,545,756 B2 | 10/2013 | Holtlund |
| 8,567,425 B2 | 10/2013 | Tan |
| 8,573,033 B2 | 11/2013 | Larsen |
| 8,591,829 B2 | 11/2013 | Taylor |
| 8,646,842 B2 | 2/2014 | Barfuss |
| 8,663,583 B2 | 3/2014 | Kelley |
| 8,741,233 B2 | 6/2014 | Bardell |
| 8,741,234 B2 | 6/2014 | Wang |
| 8,741,235 B2 | 6/2014 | Janisch |
| 8,747,747 B2 | 6/2014 | Hunter |
| 8,828,320 B2 | 9/2014 | Bardell |
| 8,835,184 B2 | 9/2014 | Redmond |
| 8,846,380 B2 | 9/2014 | Bae |
| 8,940,499 B2 | 1/2015 | Kuang |
| 8,945,913 B2 | 2/2015 | Kasdan |
| 8,980,635 B2 | 3/2015 | Kelley |
| 9,029,158 B2 | 5/2015 | Tai |
| 9,140,694 B2 | 9/2015 | Holtlund |
| 9,234,884 B2 | 1/2016 | Tai |
| 9,494,570 B2 | 11/2016 | Bransky |
| 2002/0042125 A1* | 4/2002 | Petersen ............ B01L 3/502753 436/178 |
| 2003/0005967 A1 | 1/2003 | Karp |
| 2003/0030783 A1 | 2/2003 | Roche |
| 2004/0005247 A1 | 1/2004 | Karp |
| 2004/0241042 A1 | 12/2004 | Pugia |
| 2005/0136552 A1 | 6/2005 | Buechler |
| 2006/0177347 A1* | 8/2006 | Larsen .................. B01F 33/403 436/17 |
| 2006/0257993 A1* | 11/2006 | McDevitt ........... G01N 21/6428 435/287.2 |
| 2007/0003434 A1 | 1/2007 | Padmanabhan |
| 2007/0039835 A1 | 2/2007 | Rossier |
| 2007/0154351 A1 | 7/2007 | Bae |
| 2007/0190525 A1* | 8/2007 | Gu ..................... G01N 33/5094 435/5 |
| 2008/0085560 A1 | 4/2008 | Ekberg |
| 2008/0199971 A1 | 8/2008 | Tondra |
| 2008/0273918 A1 | 11/2008 | Linder |
| 2009/0075390 A1 | 3/2009 | Linder |
| 2009/0266421 A1 | 10/2009 | Linder |
| 2009/0291507 A1 | 11/2009 | Clemens |
| 2009/0325217 A1 | 12/2009 | Luscher |
| 2010/0288689 A1 | 11/2010 | Zhu |
| 2011/0002812 A1 | 1/2011 | Asogawa |
| 2011/0235030 A1 | 9/2011 | Champseix |
| 2012/0107811 A1 | 5/2012 | Kelso |
| 2012/0287525 A1 | 11/2012 | Matsui |
| 2013/0130262 A1 | 5/2013 | Battrell |
| 2013/0343955 A1 | 12/2013 | Doyle |
| 2013/0344474 A1 | 12/2013 | Yatsuhashi |
| 2013/0344475 A1 | 12/2013 | Jovanovich |
| 2014/0033809 A1* | 2/2014 | Bransky ............ B01L 3/502738 73/64.56 |
| 2014/0038809 A1 | 2/2014 | Ramis |
| 2014/0170678 A1 | 6/2014 | Kasdan |
| 2014/0170680 A1 | 6/2014 | Meissonnier |
| 2014/0211205 A1 | 7/2014 | Bardell |
| 2014/0287525 A1 | 9/2014 | Talmer |
| 2014/0301915 A1 | 10/2014 | Doyle |
| 2014/0349381 A1 | 11/2014 | Battrell |
| 2014/0356941 A1 | 12/2014 | Bransky |
| 2015/0151295 A1 | 6/2015 | Kimura |
| 2015/0309049 A1 | 10/2015 | Kasdan |
| 2015/0330963 A1 | 11/2015 | Vidal |
| 2016/0129445 A1 | 5/2016 | Corey |
| 2016/0130640 A1 | 5/2016 | Wright |
| 2016/0356722 A1 | 12/2016 | Glezer |
| 2016/0361715 A1* | 12/2016 | Shi ..................... A61B 10/0096 |
| 2017/0016753 A1 | 1/2017 | Shi |
| 2017/0030824 A1 | 2/2017 | Takeuchi |

FOREIGN PATENT DOCUMENTS

| | | |
|---|---|---|
| WO | 2011/094577 A1 | 8/2011 |
| WO | 2016/200922 A1 | 12/2016 |
| WO | 2017/011554 A1 | 1/2017 |

OTHER PUBLICATIONS

PCT Application No. PCT/US2018/031893, International Preliminary Report on Patentability, dated Nov. 12, 2019, 9 pages.
PCT Application No. PCT/US2018/031893, International Search Report and Written Opinion, dated Aug. 3, 2018, 10 pages.
PCT Application No. PCT/US2017/062765, International Preliminary Report on Patentability, dated Jun. 6, 2019, 12 pages.
PCT Application No. PCT/US2017/062765, International Search Report and Written Opinion, dated Jan. 29, 2018, 4 pages.

(56) References Cited

OTHER PUBLICATIONS

Maleki T et al., Point-Of_Care, Portable Microfluidic Blood Analyzer System, Microfluidics, BioMEMS, and Medical Microsystems X, Feb. 9, 2012, abstract, 14 pages.

Ducree, J. et al., The Centrifugal Microfluidic Bio-Disk Platform, Journal of Micromechanics and Microengineering, vol. 17:S103-S115, Jun. 28, 2007.

U.S. Appl. No. 15/803,133, Office Action dated Oct. 16, 2019, 27 pages.

Four-part leukocyte differential count based on sheathless microflow cytometer and fluorescent dye assay, W. Shi, L. Guo, H. Kasdan, YC Tai-Lab on a Chip, 2013.

Al-Faqheri et al., Development of a passive liquid valve (PLV) utilizing a pressure equilibrium phenomenon on the centrifugal microfluidic platform. Sensors, 15(3):4658-4676 (2015).

Henning, Micro-Pneumatic Logic. 2004 ASME International Mechanical Engineering Congress and RD&D Expo, Anaheim, CA, Nov. 15-21, 2004.

PCT Application No. PCT/US2016/036426, International Search Report and Written Opinion, dated Sep. 6, 2016.

PCT Application No. PCT/US2016/042089, International Search Report and Written Opinion, dated Dec. 8, 2016.

EP Application No. 16808175.0, Extended European Search Report, dated Jan. 30, 2019.

EP Application No. 16825111.4, Extended European Search Report, dated Jun. 5, 2019.

\* cited by examiner

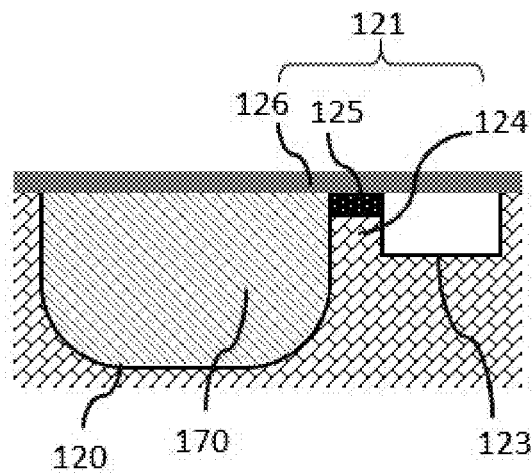
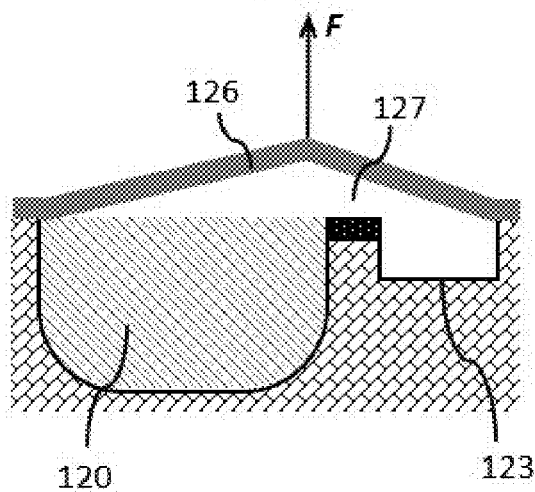
FIG. 4A
FIG. 4B
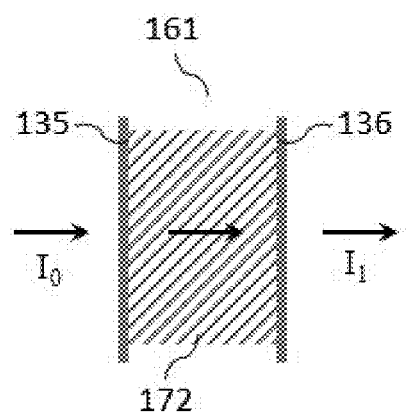
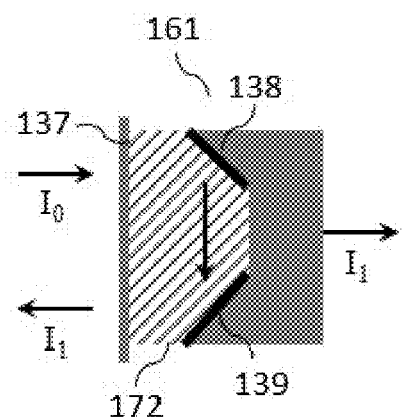
FIG. 5A
FIG. 5B

DEVICES AND METHODS FOR MEASURING ANALYTES AND TARGET PARTICLES

CROSS REFERENCE TO RELATED APPLICATIONS

This application is the United State national stage entry under 37 U.S.C. 371 of PCT/US2018/056725 filed on Oct. 19, 2018, which claims priority to U.S. Provisional Application No. 62/575,918 filed on Oct. 23, 2017, the disclosure of which are incorporated by reference herein in their entireties.

FIELD OF THE DISCLOSURE

The disclosure relates generally to medicine and cytometry. More specifically, the disclosure relates to devices and methods for measuring analytes and target particles.

BACKGROUND

All publications cited herein are incorporated by reference in their entireties to the same extent as if each individual publication or patent application was specifically and individually indicated to be incorporated by reference. The following description includes information that may be useful in understanding the present disclosure. It is not an admission that any of the information provided herein is prior art or relevant to the present disclosure, or that any publication specifically or implicitly referenced is prior art.

Leukocyte cells and hemoglobin in blood are often measured together in medical diagnostics. They are part of a diagnostic test called complete blood count (CBC). Previously, a cuvette device for the measurement of hemoglobin is described in U.S. Pat. No. 5,674,457. Similarly, a cuvette device for the measurement of leukocyte cells is described in U.S. Pat. No. 7,521,243. However, these cuvette devices measure either hemoglobin or leukocyte cells, but not both. U.S. Pat. No. 7,771,658 discloses a cartridge device, which is used to measure both hemoglobin and leukocyte cells. In this device, a rotating structure is necessary to collect a sample into to the device, and electrical impedance is measured for the detection of leukocyte cells with limited accuracy. U.S. Pat. No. 8,741,234 discloses another cartridge device, which receives a reagent from an instrument device to form a sample mixture and requires a sleeving or sheath flow to form a sample stream in a flow cell for the detection of leukocyte cells. The laboratory tools for measuring hemoglobin and leukocyte cells usually have direct contact with blood samples or sample mixtures, which are considered biohazards.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

To overcome the various issues related to biohazards, accuracy, and convenience, here we provide a cartridge device, a control unit device and a method for the measurement of hemoglobin and leukocyte cells. Measuring leukocyte cells and hemoglobin in a self-contained device avoids the problematic exposure to biohazards. Such a device receives a blood sample and forms the sample mixture inside the device. After being received in an instrument for signal measurements, the device is disposed without exposing the instrument or the user environment to biohazards.

Also, the cartridge device, the control unit device, and the method are used for measurements of many other types of analytes and target particles in a blood sample. Examples of those analytes include but are not limited to proteins (e.g., hemoglobin, C-reactive protein, and albumin, et cetera), protein fragments or protein complexes (e.g., D-dimer and troponin, et cetera), enzymes (e.g., aspartate transaminase and alanine transaminase, et cetera), and other molecules (e.g., urea and creatinine, et cetera). Example of those target particles include but are not limited to blood cells (e.g., leukocyte cells, erythrocyte cells, and platelet cells, et cetera), other cells (e.g., circulating tumor cells and bacteria cells, et cetera), and other particles (e.g., DNA fragments, et cetera).

In various embodiments, additional particles such as beads are introduced as a part of a reagent to mix with the blood sample and are used to capture certain analytes (e.g., proteins) in the blood sample. The beads with captured analytes are measured as the target particles.

In addition, the cartridge device, the control unit device, and the method are used for measurements of analytes and/or target particles in other biological samples, which include but are not limited to urine, saliva, and cerebrospinal fluid, et cetera.

In various embodiments, the cartridge device is used to measure more than one type of analytes and/or more than one group of target particles. As a non-limiting example, it is used to measure hemoglobin as a first analyte, C-reactive protein as a second analyte, and leukocyte cells as the target particles.

Various embodiments of the present disclosure provide a cartridge device for measuring at least one item in a sample, the at least one item being selected from the group consisting of an analyte and a target particle. The cartridge device includes a reagent chamber configured for accommodating a reagent; a mixing chamber configured for mixing at least a portion of the sample with at least a portion of the reagent to form a first sample mixture; a first detection area comprising an optically transparent area, the first detection area being configured for measuring the analyte in the first sample mixture; and a second detection area comprising a flow cell, the flow cell being configured for forming a sample stream of at least a portion of the first sample mixture and the second detection area is configured for measuring the target particle in the first sample stream.

Various embodiments of the present disclosure provide an analyzer for measuring at least one item in a sample, the at least one item being selected from the group consisting of an analyte and a target particle. The analyzer includes a cartridge device as disclosed herein and a control unit device. The control unit device includes a receiving module configured for receiving the cartridge device to interact with the control unit device; a first detection module configured for measuring a signal from the first detection area of the cartridge device; a second detection module configured for measuring a signal from the flow cell of the second detection area of the cartridge device; and an analysis module configured for analyzing the signal from the first detection module to measure the analyte and analyzing the signal from the second detection module to measure the target particle.

In various embodiments, the analyzer further includes a sensing module for measuring a sensing signal to detect when a sample mixture enters or exits a designated sensing area of the cartridge device, and the analysis module of the analyzer is further configured for analyzing the sensing signal to determine the concentration of the target particle.

Various embodiments of the present disclosure provide a method for measuring at least one item in a sample, the at least one item being selected from the group consisting of an analyte and a target particle. The method includes applying a sample to a cartridge device as disclosed herein; transferring the cartridge device into a control unit device; mixing at least a portion of the sample and at least a portion of a reagent inside the cartridge device to form a first sample mixture; and using the cartridge device and the control unit device to measure the analyte and/or the target particle.

In various embodiments, the method further includes mixing at least a portion of the sample and at least a portion of a reagent inside the cartridge device to form a sample mixture; forming a sample stream from at least a portion of the sample mixture; measuring a signal from the first detection area of the cartridge device and analyzing the signal from the first detection area to measure the analyte; and measuring a signal from the flow cell of the second detection area of the cartridge device and analyzing the signal from the flow cell to measure the target particle.

In various embodiments, the method further includes mixing at least a portion of the first sample mixture with at least a portion of a second reagent inside the cartridge device to form a second sample mixture; and measuring an analyte from the second sample mixture in the first detection area of the cartridge device, or a target particle from the second sample mixture in the second detection area of the cartridge device.

In various embodiments, a cartridge device as disclosed herein includes one, two, three, or more reagent chambers.

In various embodiments, the analyte is hemoglobin.

In various embodiments, the target particle is a leukocyte.

BRIEF DESCRIPTION OF THE DRAWINGS

Illustrative embodiments of the present disclosure are described in detail below with reference to the figures.

FIG. 4A and FIG. 4B illustrate a valve component according to some embodiments of the disclosure.

FIG. 5A and FIG. 5B illustrate a first detection area according to some embodiments of the disclosure.

DETAILED DESCRIPTION

Figure 1A:
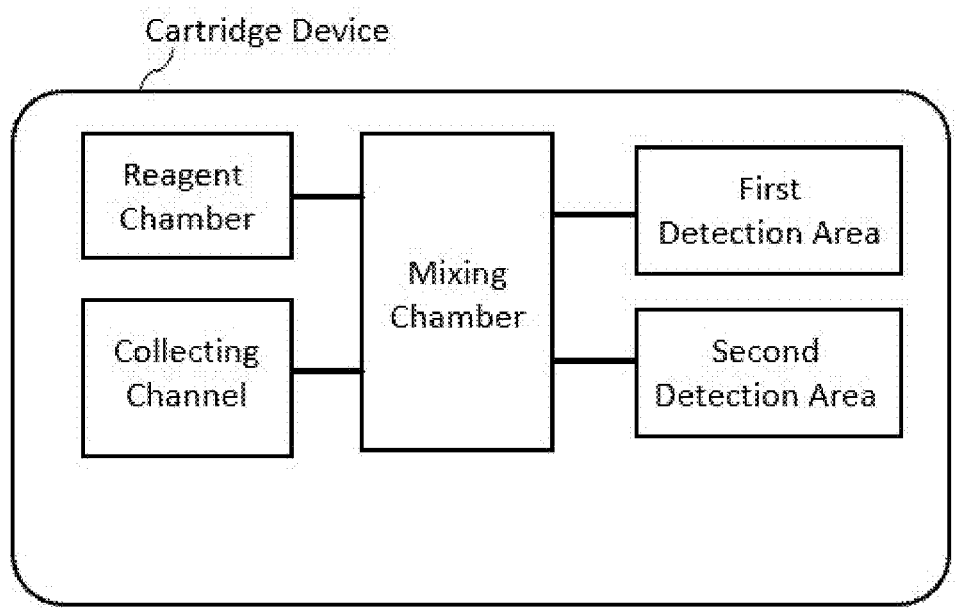
FIG. 1A illustrates a cartridge device according to some embodiments of the disclosure.

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

All references cited herein are incorporated by reference in their entireties. Unless defined otherwise, technical, and scientific terms used herein have the same meaning as commonly understood by one of ordinary skill in the art to which this disclosure belongs. Introduction to Microfluidics reprint edition, Oxford University Press (2010); Hguyen et al., Fundamentals and Applications of Microfluidics 2nd ed., Artech House Incorporated (2006); Berg et al., Microfluidics for Medical Applications, Royal Society of Chemistry (2014); Gomez et al., Biological Applications of Microfluidics 1st ed., Wiley-Interscience (2008); and Colin et al., Microfluidics 1st ed., Wiley-ISTE (2010), provide one skilled in the art with a general guide to many of the terms used in the disclosure.

One skilled in the art will recognize many methods and materials similar or equivalent to those described herein, which could be used in the practice of the present disclosure. Other features and advantages of the disclosure will become apparent from the following detailed description, taken in conjunction with the accompanying drawings, which illustrate, by way of example, various features of embodiments of the disclosure. Indeed, the present disclosure is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this disclosure belongs. It should be understood that this disclosure is not limited to the particular methodology, devices, systems, protocols, and reagents, et cetera, described herein and as such may vary. The definitions and terminology used herein are provided to aid in describing particular embodiments, and are not intended to limit the claims.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having"

should be interpreted as "having at least," the term "includes" should be interpreted as "includes but is not limited to," et cetera).

Unless stated otherwise, the terms "a" and "an" and "the" and similar references used in the context of describing a particular embodiment of the application (especially in the context of claims) may be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein may be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

Various embodiments of the present disclosure provide a cartridge device for measuring an analyte and/or a target particle in a sample. The cartridge device includes: a reagent chamber configured for accommodating a reagent; a mixing chamber configured for mixing at least a portion of the sample with at least a portion of the reagent to form a sample mixture; a first detection area including an optically transparent area. The first detection area is configured for measuring the analyte in the sample mixture; and a second detection area including a flow cell. The flow cell is configured for forming a sample stream of at least a portion of the sample mixture and the second detection area is configured for measuring the target particle in the sample stream. In various embodiments, a cartridge device as described herein further includes a second reagent chamber configured for accommodating a second reagent. In various embodiments, the reagent chamber and the second reagent chamber are both connected to the mixing chamber. In various embodiments, the mixing chamber is configured to mix at least a portion of the sample mixture with at least a portion of the second reagent to form a second sample mixture. In various embodiments, the analyte is hemoglobin. In various embodiments, the target particle is a leukocyte.

Various embodiments of the present disclosure provide a cartridge device for detecting an analyte (e.g., hemoglobin) and a group of target particles (e.g., leukocyte cells) in a sample. The cartridge device includes: a reagent chamber configured for accommodating a reagent; a mixing chamber configured for mixing at least a portion of the sample with at least a portion of the reagent to form a sample mixture; a first detection area including at least one optically transparent area. The first detection area is configured for measuring at least a portion of the sample mixture to detect the analyte (e.g., hemoglobin); and a second detection area including a flow cell. The second detection area is configured for forming a sample stream from at least a portion of the sample mixture and measuring the sample stream to detect the group of target particles (e.g., leukocyte cells). In various embodiments, a cartridge device as described herein further includes a second reagent chamber configured for accommodating a second reagent. In various embodiments, the reagent chamber and the second reagent chamber are both connected to the mixing chamber. In various embodiments, the mixing chamber is configured to mix at least a portion of the sample mixture with at least a portion of the second reagent to form a second sample mixture.

Various embodiments of the present disclosure provide a cartridge device for measuring a first analyte and/or a first target particle in a sample. The cartridge device includes: a first reagent chamber configured for accommodating a first reagent; a mixing chamber configured for mixing at least a portion of the sample with at least a portion of the first reagent to form a first sample mixture; a first detection area including an optically transparent area. The first detection area is configured for measuring the first analyte in the first sample mixture; and a second detection area including a flow cell. The flow cell is configured for forming a sample stream of at least a portion of the first sample mixture and the second detection area is configured for measuring the first target particle in the sample stream. In various embodiments, a cartridge device as described herein further includes a second reagent chamber configured for accommodating a second reagent. In various embodiments, the reagent chamber and the second reagent chamber are both connected to the mixing chamber. In various embodiments, the mixing chamber is configured to mix at least a portion of the first sample mixture with at least a portion of the second reagent to form a second sample mixture. In various embodiments, the first analyte is hemoglobin. In various embodiments, the first target particle is a leukocyte.

Various embodiments of the present disclosure provide a cartridge device for detecting a first analyte (e.g., hemoglobin) and a first group of target particles (e.g., leukocyte cells) in a sample. The cartridge device includes: a first reagent chamber configured for accommodating a first reagent; a mixing chamber configured for mixing at least a portion of the sample with at least a portion of the first reagent to form a first sample mixture; a first detection area including at least one optically transparent area. The first detection area is configured for measuring at least a portion of the first sample mixture to detect the first analyte (e.g., hemoglobin); and a second detection area including a flow cell. The second detection area is configured for forming a sample stream from at least a portion of the first sample mixture and measuring the sample stream to detect the first group of target particles (e.g., leukocyte cells). In various embodiments, a cartridge device as described herein further includes a second reagent chamber configured for accommodating a second reagent. In various embodiments, the reagent chamber and the second reagent chamber are both connected to the mixing chamber. In various embodiments, the mixing chamber is configured to mix at least a portion of the first sample mixture with at least a portion of the second reagent to form a second sample mixture.

In some embodiments, the cartridge device is configured to measure the second sample mixture in the first detection area to detect a second analyte. In some embodiments, the cartridge device is configured to measure the second sample mixture in the flow cell of the second detection area to detect the second analyte. In some embodiments, the cartridge device is configured to measure the second sample mixture in the flow cell of the second detection area to detect a second group of target particles (e.g., CD4+ lymphocytes).

Various embodiments of the present disclosure provide an analyzer for measuring an analyte and/or a target particle in a sample. The analyzer includes a cartridge device as described herein and a control unit device. The control unit device includes: a receiving module configured for receiving the cartridge device to interact with the control unit device; a first detection module configured for measuring a signal from the first detection area; a second detection module configured for measuring a signal from the flow cell of the second detection area; and an analysis module configured for analyzing the signal from the first detection module to measure the analyte and analyzing the signal from the second detection module to measure the target particle.

In various embodiments, the first detection module is configured for detecting a light signal. In various embodiments, the light signal has a wavelength in the range of about 470-nm, and/or a light signal having a wavelength in the range of about 650-1200 nm. In various embodiments, the second detection module is configured for detecting an optical signal. In various embodiments, the optical signal includes scattered light, transmitted light, reflected light, fluorescent light, light extinction, light absorption, or white light image, or a combination thereof. In various embodiments, an analyzer as described herein further includes a sensing module for measuring a sensing signal to detect when a sample mixture enters or exits a designated sensing area of the cartridge device. In various embodiments, the analysis module is further configured for analyzing the sensing signal to determine the concentration of the target particle.

Various embodiments of the present disclosure provide a method for measuring an analyte and/or a target particle in a sample. The method includes: applying a sample to a cartridge device as described herein; transferring the cartridge device into a control unit device; and using the cartridge device and the control unit device to measure the analyte and/or the target particle. In various embodiments, the control unit device further measures a sensing signal from a designated sensing area of the cartridge device to determine the concentration of the target particle. In various embodiments, the sample applied to the cartridge device is a blood sample.

In various embodiments, the method further includes: mixing at least a portion of the sample and at least a portion of a reagent inside the cartridge device to form a sample mixture; forming a sample stream from at least a portion of the sample mixture; measuring a signal from the first detection area and analyzing the signal from the first detection area to measure the analyte; and measuring a signal from the flow cell of the second detection area and analyzing the signal from the flow cell to measure the target particle. In various embodiments, a method as described herein further includes mixing at least a portion of the sample and at least a portion of a reagent inside the cartridge device to form a sample mixture. In various embodiments, mixing the sample and the reagent includes generating bubbles in the sample mixture in the cartridge device.

In various embodiments, the control unit device detects a light signal from the first detection area to measure the analyte. In various embodiments, the light signal has a wavelength in the range of about 470-600 nm, and/or a light signal having a wavelength in the range of about 650-1200 nm. In various embodiments, the control unit device detects an optical signal from the flow cell to measure the target particle. In various embodiments, the optical signal includes scattered light, transmitted light, reflected light, fluorescent light, light extinction, light absorption, or white light image, or a combination thereof.

In various embodiments, the control unit device measures the first sample mixture in the flow cell to detect the target particle. In various embodiments, the target particle includes cells, blood cells, leukocytes, or beads, or a combination thereof. In various embodiments, the control unit device measures the sample mixture in the first detection area to detect the analyte. In various embodiments, the analyte includes hemoglobin, or C-reactive protein, or a combination thereof.

In various embodiments, a method as described herein further includes mixing at least a portion of the sample mixture with at least a portion of a second reagent inside the cartridge device to form a second sample mixture. In various embodiments, the control unit device further measures the second sample mixture in the flow cell to detect a second target particle. In various embodiments, the control unit device further measures the second sample mixture in the first detection area to detect a second analyte.

In various embodiments, the flow cell is a sheathless flow cell and configured for forming the sample stream without a sleeving or sheath flow. In various embodiments, the flow cell includes an optically transparent area configured for measuring an optical signal from a target particle in the sample stream.

In various embodiments, the first detection area is configured to have an optical path length in the range of about 0.01-0.1 mm, 0.1-0.2 mm, 0.2-1 mm, 1-5 mm, 5-10 mm, or 10-20 mm.

In various embodiments, the reagent chamber further includes a valve component.

In various embodiments, the valve component is configured to be opened by an actuation means to connect the reagent chamber with the mixing chamber for mixing the sample and the reagent. In various embodiments, the valve component includes a breakable seal. The breakable seal is configured to be opened by a mechanical force to connect the reagent chamber with the mixing chamber for mixing the sample and the reagent.

In various embodiments, a cartridge device as described herein further includes a reagent. In various embodiments, the reagent includes a hemolytic agent that lyses erythrocytes. In various embodiments, the hemolytic agent includes an ionic surfactant, and/or a non-ionic surfactant, and/or ammonium chloride. In various embodiments, the reagent includes a fluorescent staining agent that selectively stains the target particle, the first target particle, and/or the second particle. In various embodiments, the fluorescent staining agent includes a fluorescent dye and/or a fluorophore-conjugated antibody.

In various embodiments, a cartridge device as described herein further includes a pneumatic port configured for interfacing with a pneumatic pressure source. The pneumatic pressure source is configured for transferring a reagent, a sample, a first sample mixture, a second sample mixture, and/or a sample mixture inside the cartridge device.

In various embodiments, the mixing chamber includes a venting port connected to either an ambient pressure or an atmosphere pressure. In various embodiments, the mixing chamber is connected via a fluid conduit to a reagent chamber, a first reagent chamber, and/or a second reagent chamber.

In various embodiments, a cartridge device as described herein further includes a collecting channel configured for collecting the sample. In various embodiments, a cartridge device as described herein further includes a collecting channel configured for collecting a predetermined volume of the sample. In various embodiments, the collecting channel is fluidly connected to the mixing chamber. In various embodiments, the collecting channel is fluidly connected to the reagent chamber, the first reagent chamber, and/or the second reagent chamber. In various embodiments, the mixing chamber is fluidly connected to the reagent chamber, the first reagent chamber, and/or the second reagent chamber.

In some embodiments, the reagent chamber and the mixing chamber are separate chambers. In other embodiments, the reagent chamber and the mixing chamber are one chamber.

In various embodiments, a cartridge device as described herein further includes a fluid conduit connected to the flow cell. The fluid conduit includes a designated sensing area configured for measuring a sensing signal to detect when a sample mixture enters or exits the designated sensing area. In some embodiments, a cartridge device as described herein may further include a designated sensing area on a fluid conduit connected to the flow cell, and a sensing signal may be detected when a sample mixture enters or exists the designated sensing area. This detected sensing signal may be used to determine the concentration of the target particle in the sample mixture.

In various embodiments, the cartridge device has a size in the range of about 0.1-1 $cm^3$, 1-5 $cm^3$, 5-25 $cm^3$, 25-50 $cm^3$, or 50-200 $cm^3$. In some embodiments, the cartridge device has a size in the range of about 1-10 $cm^3$, 10-20 $cm^3$, 20-30 $cm^3$, 30-40 $cm^3$, 40-50 $cm^3$, 50-60 $cm^3$, 60-70 $cm^3$, 70-80 $cm^3$, 80-90 $cm^3$, 90-100 $cm^3$, 110-120 $cm^3$, 120-130 $cm^3$, 130-140 $cm^3$, 140-150 $cm^3$, 150-160 $cm^3$, 160-170 $cm^3$, 170-180 $cm^3$, 180-190 $cm^3$, or 190-200 $cm^3$.

In various embodiments, the collecting channel is stationary in the cartridge device. In various embodiments, collecting channel has a cross section area in the range of about 0.01-0.1 $mm^2$, 0.1-1 $mm^2$, or 1-5 $mm^2$. In various embodiments, the collecting channel is configured for collecting a sample volume in the range of about 0.1-1 µL, 1-5 µL, 5-10 µL, 10-20 µL, or 20-50 µL. In some embodiments, the collecting channel is stationary in the cartridge device; the collecting channel has a cross section area in the range of about 0.01-0.1 $mm^2$, 0.1-1 $mm^2$, or 1-5 $mm^2$; and the collecting channel is configured for collecting a sample volume in the range of about 0.1-1 µL, 1-5 µL, 5-10 µL, 10-20 µL, or 20-50 µL.

In various embodiments, at least a portion of the collecting channel is hydrophilic. In various embodiments, the sample is collected into the collecting channel by capillary action. In various embodiments, the collecting channel further includes at least one stop valve configured for stopping the capillary action to collect a predetermined sample volume. In some embodiments, at least a portion of the collecting channel is hydrophilic; the sample is collected into the collecting channel by capillary action; and the collecting channel further includes a stop valve configured for stopping the capillary action to collect a predetermined sample volume.

In various embodiments, a reagent chamber (e.g., the first reagent chamber or the second reagent chamber) further includes a valve component in closed status; and the valve component is configured to be opened by an actuation means to connect the reagent chamber with the mixing chamber. In various embodiments, the valve component includes a breakable seal; and the actuation means includes a mechanical force configured for breaking the breakable seal. In various embodiments, each reagent chamber includes its own valve component. In some embodiments, the first reagent chamber and the second reagent chamber each include a valve accordingly.

In various embodiments, the mixing chamber includes at least one venting port connected to either an ambient pressure or an atmosphere pressure.

In various embodiments, the first detection area is fluidly connected to the mixing chamber. In some embodiments, the first detection area is part of the mixing chamber. In various embodiments, the first detection area is configured to have an optical path length in the range of about 0.01-0.1 mm, 0.1-0.2 mm, 0.2-1 mm, 1-5 mm, 5-10 mm, or 10-20 mm.

In various embodiments, the second detection area is fluidly connected to the mixing chamber. In various embodiments, the flow cell is a sheathless flow cell. In various embodiments, the flow cell is configured for forming the sample stream without a sleeving or sheath flow.

In various embodiments, the flow cell has a cross section area in the range of about 100-200 $\mu m^2$, 200-300 $\mu m^2$, 300-400 $\mu m^2$, 400-500 $\mu m^2$, 500-600 $\mu m^2$, 600-700 $\mu m^2$, 700-800 $\mu m^2$, 800-900 $\mu m^2$, or 900-1000 $\mu m^2$. In various embodiments, the flow cell has a cross section area in the range of about 1000-2000 $\mu m^2$, 2000-3000 $\mu m^2$, 3000-4000 $\mu m^2$, 4000-5000 $\mu m^2$, 5000-6000 $\mu m^2$, 6000-7000 $\mu m^2$, 7000-8000 $\mu m^2$, 8000-9000 $\mu m^2$, or 9000-10000 $\mu m^2$. In various embodiments, the flow cell has a cross section area in the range of about 10000-20000 $\mu m^2$, 20000-30000 $\mu m^2$, or 30000-40000 $\mu m^2$. In various embodiments, the flow cell has a cross section area in the range of about 200-900 $\mu m^2$, 900-1800 $\mu m^2$, 1800-3600 $\mu m^2$, 3600-6400 $\mu m^2$, or 6400-40000 $\mu m^2$. In some embodiments, the flow cell has a cross section area in the range of about 200-900 $\mu m^2$, 900-1800 $\mu m^2$, 1800-3600 $\mu m^2$, 3600-6400 $\mu m^2$, or 6400-40000 $\mu m^2$; and the flow cell is configured for forming the sample stream without a sleeving or sheath flow.

In various embodiments, the cartridge device further includes at least one interface configured for interfacing with actuation means external to the cartridge device. In various embodiments, at least one of the actuation means is configured for transferring the reagent, and/or the sample, and/or the sample mixture inside the cartridge device. In some embodiments, the cartridge device further includes at least one interface configured for interfacing with actuation means external to the cartridge device, and at least one of the actuation means is configured for transferring the reagent, and/or the sample, and/or the sample mixture inside the cartridge device.

In various embodiments, the interface includes at least one pneumatic port configured for interfacing with a pneumatic pressure source. In various embodiments, the pneumatic pressure source is configured for transferring the reagent, and/or the sample, and/or the sample mixture inside the cartridge device. In some embodiments, the interface includes at least one pneumatic port configured for interfacing with a pneumatic pressure source; and the pneumatic pressure source is configured for transferring the reagent, and/or the sample, and/or the sample mixture inside the cartridge device.

In various embodiments, the cartridge device further includes a reagent. In various embodiments, the cartridge device further includes one, two, three, or more reagents. In some embodiments, the cartridge device further includes a first reagent and a second reagent.

In various embodiments, the reagent includes at least one staining agent that selectively stains the leukocyte cells. In various embodiments, the flow cell has at least one optically transparent area configured for measuring at least one optical signal from the sample stream in the flow cell. In some embodiments, the cartridge device further includes a reagent; the reagent includes at least one staining agent that selectively stains the leukocyte cells; and the flow cell has at least one optically transparent area configured for measuring at least one optical signal from the sample stream in the flow cell.

In various embodiments, the staining agent includes at least one fluorescent dye that selectively stains the leukocyte cells. In various embodiments, at least one fluorescent light is measured from the sample stream in the flow cell. In some embodiments, the staining agent includes at least one fluorescent dye that selectively stains the leukocyte cells; and at least one fluorescent light is measured from the sample stream in the flow cell.

In various embodiments, the reagent includes at least one hemolytic agent that lyses erythrocyte cells in the sample. In various embodiments, the hemolytic agent includes at least one ionic surfactant. In some embodiments, the reagent includes at least one hemolytic agent that lyses erythrocyte cells in the sample; and the hemolytic agent includes at least one ionic surfactant.

In various embodiments, at least a portion of the reagent in the cartridge device is in the form of a liquid solution. In various embodiments, the volume of the liquid solution is in the range of about 10-100 µL, 100-300 µL, 300-600 µL, 600-1000 µL, or 1000-2000 µL. In various embodiments, the volume of the liquid solution is in the range of about 100-200 µL, 200-300 µL, 300-400 µL, 400-500 µL, 500-600 µL, 600-700 µL, 700-800 µL, 800-900 µL, or 900-1000 µL. In various embodiments, the volume of the liquid solution is in the range of about 1000-1100 µL, 1100-1200 µL, 1200-1300 µL, 1300-1400 µL, 1400-1500 µL, 1500-1600 µL, 1600-1700 µL, 1700-1800 µL, 1800-1900 µL, or 1900-2000 µL. In various embodiments, and the sample mixture has a dilution ratio between the reagent and the sample in the range of about 10:1 to 30:1, 30:1 to 60:1, 60:1 to 80:1, 80:1 to 100:1, 100:1 to 200:1, or 200:1 to 500:1. In some embodiments, at least a portion of the reagent in the cartridge device is in the form of a liquid solution; the volume of the liquid solution is in the range of about 10-100 µL, 100-300 µL, 300-600 µL, 600-1000 µL, or 1000-2000 µL; and the sample mixture has a dilution ratio between the reagent and the sample in the range of about 10:1 to 30:1, 30:1 to 60:1, 60:1 to 80:1, 80:1 to 100:1, 100:1 to 200:1, or 200:1 to 500:1.

In various embodiments, the reagent in the cartridge device is in the form of at least a liquid solution and at least a dried powder of compounds; and the liquid solution and the dried powder are stored separately on the cartridge device.

Various embodiments of the disclosure provide an analyzer for detecting hemoglobin and leukocyte cells in a sample. The analyzer device includes: a cartridge device as disclosed herein and a control unit device. The control unit device includes: a receiving module configured for receiving the cartridge device to interact with the control unit device; a first detection module configured for measuring a signal from the first detection area; a second detection module configured for measuring a signal from the flow cell of the second detection area; and an analysis module configured for analyzing the signal from the first detection module to determine the hemoglobin level and analyzing the signal from the second detection module to determine the level of leukocyte cells.

In various embodiments, the first detection module is configured for detecting at least one optical signal. In various embodiments, the first detection module is configured for detecting a light signal having a wavelength in the range of about 470-600 nm, and/or a light signal having a wavelength in the range of about 650-1200 nm. In some embodiments, the first detection module is configured for detecting a light signal having a wavelength in the range of about 470-600 nm. In some embodiments, the first detection module is configured for detecting a light signal having a wavelength in the range of about 650-1200 nm. In some embodiments, the first detection module is configured for detecting a light signal having a wavelength in the range of either about 470-600 nm or about 650-1200 nm. In some embodiments, the first detection module is configured for detecting a light signal having a wavelength in the range of about 470-600 nm and a light signal having a wavelength in the range of about 650-1200 nm.

In various embodiments, the second detection module is configured for detecting at least one optical signal. In various embodiments, the second detection module is configured for detecting scattered light, transmitted light, reflected light, fluorescent light, light extinction, light absorption, or white light image, or a combination thereof.

In various embodiments, the control unit device further includes an actuation module configured for providing actuation means to the cartridge device. In various embodiments, the actuation means include at least one pneumatic pressure source. In various embodiments, the actuation means include at least one mechanic force source. In some embodiments, the control unit device further includes an actuation module configured for providing actuation means to the cartridge device. The actuation means include at least one pneumatic pressure source.

Various embodiments of the disclosure provide a method for detecting hemoglobin and leukocyte cells in a sample. The method includes: applying a sample to a cartridge device as disclosed herein, which has a collecting channel configured for collecting a predetermined sample volume into the cartridge device; transferring the cartridge device into a control unit device as disclosed herein; mixing at least a portion of the collected sample and at least a portion of a reagent inside the cartridge device to form a sample mixture; detecting an optical signal from at least a portion of the sample mixture to determine the hemoglobin level. The optical signal is detected by a first sensor in the control unit device; and forming a sample stream from at least a portion of the sample mixture in a flow cell and detecting a signal from the sample stream to determine the level of leukocyte cells. The signal is detected by a second sensor in the control unit device.

In some embodiments, the control unit device does not receive any liquid from the cartridge device. In some embodiments, the control unit device does not transfer any liquid into the cartridge device. In various embodiments, the control unit device neither receives any liquid from the cartridge device nor transfers any liquid into the cartridge device.

In various embodiments, the cartridge device is separated from the control unit device before being transferred into the control unit device. In some embodiments, the cartridge has a size in the range of about 0.1-1 cm$^3$, 1-5 cm$^3$, 5-25 cm$^3$, 25-50 cm$^3$, or 50-200 cm$^3$; and the cartridge device is separated from the control unit device before being transferred into the control unit device.

In various embodiments, a sample volume in the range of about 0.1-1 µL, 1-5 µL, 5-10 µL, 10-20 µL, or 20-50 µL is collected into the collecting channel by capillary action. In some embodiments, the collecting channel is stationary in the cartridge device; and a sample volume in the range of about 0.1-1 µL, 1-5 µL, 5-10 µL, 10-20 µL, or 20-50 µL is collected into the collecting channel by capillary action.

In various embodiments, mixing the sample and the reagent includes generating bubbles in the sample mixture in the cartridge device.

In various embodiments, the reagent volume used for mixing is in the range of about 10-100 µL, 100-300 µL, 300-600 µL, 600-1000 µL, or 1000-2000 µL.

In various embodiments, the reagent volume used for mixing is in the range of about 10-20 µL, 20-30 µL, 30-40 µL, 40-50 µL, 50-60 µL, 60-70 µL, 70-80 µL, 80-90 µL, or 90-100 µL. In various embodiments, the reagent volume used for mixing is in the range of about 100-200 µL, 200-300 µL, 300-400 µL, 400-500 µL, 500-600 µL, 600-700 µL, 700-800 µL, 800-900 µL, or 900-1000 µL. In various embodiments, the reagent volume used for mixing is in the range of about 1000-1100 µL, 1100-1200 µL, 1200-1300 µL, 1300-1400 µL, 1400-1500 µL, 1500-1600 µL, 1600-1700 µL, 1700-1800 µL, 1800-1900 µL, or 1900-2000 µL. In various embodiments, the sample mixture has a dilution ratio between the reagent and the sample in the range of about 10:1 to 30:1, 30:1 to 60:1, 60:1 to 80:1, 80:1 to 100:1, 100:1 to 200:1, or 200:1 to 500:1. In some embodiments, the reagent volume used for mixing is in the range of about 10-100 µL, 100-300 µL, 300-600 µL, 600-1000 µL, or 1000-2000 µL; and the sample mixture has a dilution ratio between the reagent and the sample in the range of about 10:1 to 30:1, 30:1 to 60:1, 60:1 to 80:1, 80:1 to 100:1, 100:1 to 200:1, or 200:1 to 500:1.

In various embodiments, the optical signal detected by the first sensor includes at least one light signal that has traveled in the sample mixture through an optical path length in the range of about 0.01-0.1 mm, 0.1-0.2 mm, 0.2-1 mm, 1-5 mm, 5-10 mm, or 10-20 mm before being detected. In various embodiments, the light signal has a wavelength in the range of about 470-600 nm or 650-1200 nm. In some embodiments, the optical signal detected by the first sensor includes at least one light signal that has traveled in the sample mixture through an optical path length in the range of about 0.01-0.1 mm, 0.1-0.2 mm, 0.2-1 mm, 1-5 mm, 5-10 mm, or 10-20 mm before being detected; and the light signal has a wavelength in the range of about 470-600 nm or 650-1200 nm.

In various embodiments, the sample stream is formed in the flow cell without a sleeving or sheath flow. In some embodiments, the flow cell has a cross section area in the range of about 200-900 µm$^2$, 900-1800 µm$^2$, 1800-3600 µm$^2$, 3600-6400 µm$^2$, or 6400-40000 µm$^2$; and the sample stream is formed in the flow cell without a sleeving or sheath flow.

In various embodiments, the reagent includes at least one staining agent that selectively stains the leukocyte cells; and at least one optical signal is measured from the sample stream in the flow cell to detect the leukocyte cells. In various embodiments, the staining agent includes at least one fluorescent dye that selectively stains the leukocyte cells; and at least one fluorescent light is measured from the sample stream in the flow cell to detect the leukocyte cells.

In various embodiments, the reagent includes at least one hemolytic agent that lyses erythrocyte cells in the sample. In various embodiments, the hemolytic agent includes at least one ionic surfactant. In some embodiments, the reagent includes at least one hemolytic agent that lyses erythrocyte cells in the sample; and the hemolytic agent includes at least one ionic surfactant.

In various embodiments, the reagent includes at least a liquid solution and at least a dried powder of compounds. The liquid solution and the dried powder are stored separately on the cartridge device before the mixing.

FIG. 1A is a block diagram illustrating a cartridge device as described herein, which includes a collecting channel, a reagent chamber, a mixing chamber, a first detection area and a second detection area. A biological sample, such as a blood sample, is drawn into the cartridge device via the collecting channel. The collecting channel is connected to the mixing chamber, so that the sample may be transferred from the collecting channel into the mixing chamber.

The reagent chamber contains a reagent, which is placed into the cartridge device either before collecting the sample (e.g., during the manufacturing process), or after collecting the sample (e.g., before measuring the sample). The reagent chamber is also connected to the mixing chamber, so that the reagent may be transferred into the mixing chamber to mix with the sample and form a sample mixture. The first detection area has at least one transparent window, where at least one optical signal is measured from the sample mixture to detect an analyte, which may be hemoglobin or any other analyte. The second detection area includes a flow cell, which is connected to the mixing chamber. At least a portion of the sample mixture is transferred into the flow cell to form a sample stream, and in the flow cell various measurements may be performed to detect a group of target particles, which may be leukocyte cells or any other target particles. In some embodiments, the flow cell has at least one transparent window, where at least one optical signal is measured from the sample mixture. In various embodiments, a cartridge device as described herein may include one, two, three, or more reagent chambers.

In various embodiments, the cartridge device may further include a second reagent chamber that contains a second reagent. A portion of the first sample mixture may be mixed further with at least a portion of the second reagent to form a second sample mixture. This second sample mixture may then be measured in the first detection area for a second analyte and/or in the flow cell for a second group of target particles. In certain embodiments, the mixing of the first sample mixture and the second reagent is performed in the mixing chamber.

Figure 1B:
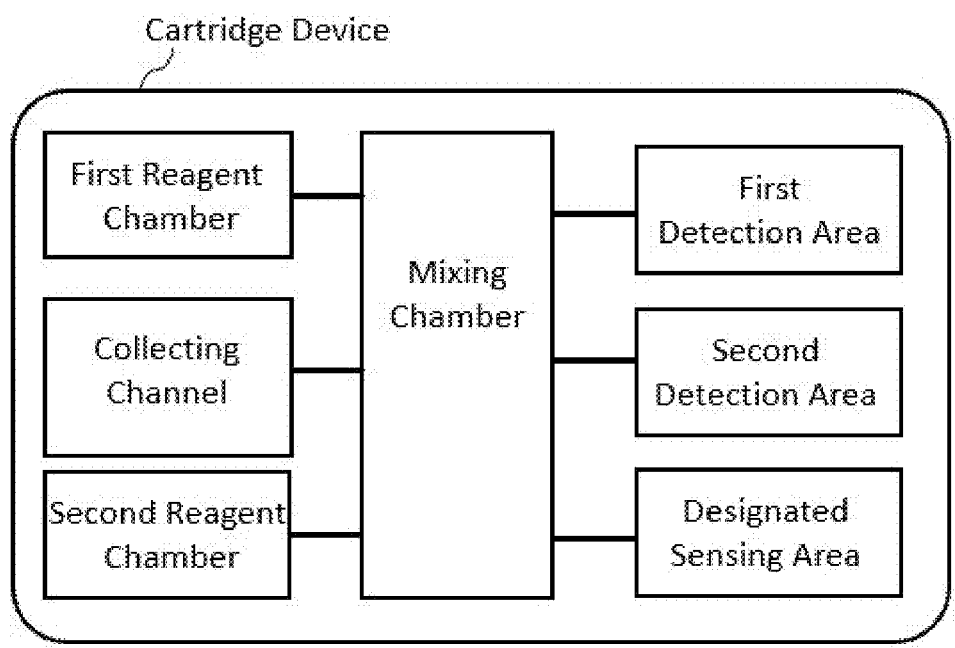
FIG. 1B illustrates a cartridge device according to other embodiments of the disclosure.

In various embodiments, the cartridge device may further include a second reagent chamber configured for accommodating a second reagent. The cartridge device is configured to form a second sample mixture with at least a portion of the first sample mixture and at least a portion of the second reagent; and the cartridge device is further configured to measure an analyte from the second sample mixture in the first detection area, or a target particle from the second sample mixture in the second detection area FIG. 1B is a block diagram illustrating a cartridge device as described herein, which includes a collecting channel, a first reagent chamber, a second reagent chamber, a mixing chamber, a designated sensing area, a first detection area and a second detection area. A biological sample, such as a blood sample, is drawn into the cartridge device via the collecting channel. The collecting channel is connected to the mixing chamber, so that the sample may be transferred from the collecting channel into the mixing chamber.

The first reagent chamber contains a first reagent, which is placed into the cartridge device either before collecting the sample (e.g., during the manufacturing process), or after collecting the sample (e.g., before measuring the sample). The first reagent chamber is also connected to the mixing chamber, so that the first reagent may be transferred into the mixing chamber to mix with the sample and form a first sample mixture. The first detection area has at least one transparent window, where at least one optical signal is measured from the first sample mixture to detect a first analyte, which may be hemoglobin or any other analyte. The second detection area includes a flow cell, which is connected to the mixing chamber. At least a portion of the first sample mixture is transferred into the flow cell to form a first sample stream, and in the flow cell various measurements may be performed to detect a first group of target particles, which may be leukocyte cells or any other target particles. In some embodiments, the flow cell has at least one transparent window, where at least one optical signal is measured from the first sample mixture.

The second reagent chamber contains a second reagent, which is placed into the cartridge device either before collecting the sample (e.g., during the manufacturing process), or after collecting the sample (e.g., before measuring the sample). The second reagent chamber is also connected to the mixing chamber, so that the second reagent may be transferred into the mixing chamber to mix with at least a portion of the first sample mixture and form a second sample mixture. The first detection area has at least one transparent window, where at least one optical signal is measured from the second sample mixture to detect a second analyte, which may be C-reactive protein or any other analyte. The second detection area includes a flow cell, which is connected to the mixing chamber. At least a portion of the second sample mixture is transferred into the flow cell to form a second sample stream, and in the flow cell various measurements may be performed to detect a second group of target particles, which may be CD4+ lymphocyte cells or any other target particles. In some embodiments, the flow cell has at least one transparent window, where at least one optical signal is measured from the second sample mixture.

In various embodiments, a sensing signal may be detected when a sample mixture enters or exits the designated sensing area. This detected sensing signal may be used to determine the concentration of the target particle in the sample mixture.

In some embodiments, the reagent or the first reagent in the cartridge device includes at least one hemolytic agent, which lyses erythrocyte cells in the blood sample and releases hemoglobin into the sample mixture. Examples of the hemolytic agent include but are not limited to ionic surfactants (e.g., sodium laureth sulfate and quaternary ammonium salts, et cetera), non-ionic surfactants (e.g., saponin and Triton X-100, et cetera), and ammonium chloride, et cetera. In some embodiments, the hemolytic agent includes at least one ionic surfactant. The reagent or the first reagent may further include at least one staining agent (e.g., a dye) that selectively stains leukocyte cells or other types of target particles. This staining agent improves the accuracy of detecting leukocyte cells or other types of target particles in the sample mixture.

The reagent or the first reagent may further include one or more other agents, which include but are not limited to leukocyte protective agents, hemoglobin stabilizing agents, organic acids or their salts, pH buffers, and any combination of these agents. Leukocyte protective agents are used to protect leukocyte cells from undesired damages caused by hemolytic agents. Hemoglobin stabilizing agents are used to stabilize hemoglobin for improved measurement. Organic acids or their salts are used to improve the identification of the eosinophil subpopulation of leukocyte cells. To balance the pH levels of the reagent and the sample mixture, pH buffers are also used.

The reagent or the first reagent in the cartridge device may be kept in various forms. In some embodiments, the reagent or the first reagent includes only one liquid solution. In other embodiments, the reagent or the first reagent includes one liquid solution and at least one dried compound that is kept separately from the liquid solution. The liquid solution is accommodated in the reagent chamber or the first reagent chamber before mixing with the sample. In some embodiments, the reagent or the first reagent chamber and the mixing chamber are the same chamber.

In some embodiments, the cartridge device is controlled by at least one actuation means from the control unit device and such an actuation means controls the transfer of a reagent, and/or a sample, and/or a sample mixture inside the cartridge device. One non-limiting example of such an actuation means is a pneumatic pressure source. In some embodiments, the cartridge device may be controlled by additional actuation means for other operations.

In various embodiments, the cartridge device may not include the collecting channel and the sample may be applied to the cartridge device in other ways. As one non-limiting example, the sample may be added directly into the mixing chamber.

In various embodiments, the cartridge device may further include a designated sensing area on a fluid conduit connected to the flow cell, where a sensing signal may be detected when a sample mixture enters or exists the designated sensing area. This sensing signal detected may be used to measure concentration of the target particles in the sample mixture.

In some embodiments, the second reagent is used to detect the second analyte in the first detection area. In certain embodiments, the second reagent includes an ingredient or component to introduce aggregation of the second analyte in the second sample mixture. Examples of the ingredient or component include but are not limited to antibodies that have selective binding affinity to the second analyte and particles conjugated with antibodies, et cetera. The mixing of the first sample mixture with the second reagent introduces a change of turbidity, which may be measured in the first detection area of the cartridge device to quantify the level of the second analyte. In certain embodiments, the second reagent include an ingredient or component to introduce a fluorescent label to the second analyte in the second sample mixture. Examples of the ingredient or component include but are not limited to antibodies conjugated with fluorophores and fluorescent dyes, et cetera. A fluorescence intensity may be measured in the first detection area to quantify the level of the second analyte. In certain embodiments, the second reagent include an ingredient or component to introduce a color change (e.g., a change in light absorption) through reaction with the second analyte in the second sample mixture. A color change (e.g., a change in light absorption) may be measured in the first detection area to quantify the level of the second analyte.

In some embodiments, the second reagent is used to detect a second group of target particles in the flow cell of the second detection area. As a non-limiting example, the second reagent includes a fluorophore-conjugated antibody (e.g., a fluorophore-conjugated anti-CD4 antibody) specific for binding to a second group of target particles in the sample (e.g., CD4+ lymphocyte cells in a blood sample). A fluorescence signal is then measured in the flow cell to detect the second group of target particles (e.g., CD4+ lymphocyte cells) in the second sample mixture.

In some embodiments, the second reagent is used to detect the second analyte in the flow cell of the second detection area. As a non-limiting example, the second reagent includes both beads coated with an antibody specific for binding to the second analyte and a fluorophore-conjugated antibody specific for binding to the second analyte. A fluorescence signal is then measured in the flow cell to detect the beads in the second sample mixture, and the intensities of individual beads are measured to quantify the level of the second analyte in the second sample mixture.

Figure 2A:
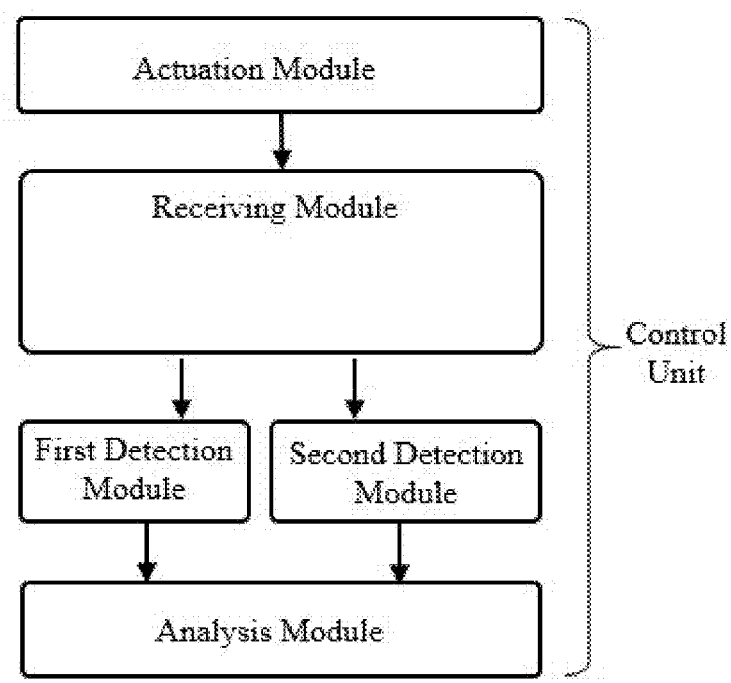
FIG. 2A illustrates a control unit device according to some embodiments of the disclosure.

FIG. 2A is a block diagram illustrating a control unit device as described herein, which includes a receiving module, a first detection module, a second detection module, and an analysis module. The receiving module receives the cartridge device to interact with the control unit device. After receiving the cartridge device, the first detection module detects at least one optical signal from a sample mixture in the first detection area. Examples of the optical signal include but are not limited to light absorption, light extinction, light transmission, light scattering, light reflection, and surface plasmon resonance. The second detection module detects a signal from a sample stream in the flow cell of the second detection area. Examples of the signal include but are not limited to electrical signals and optical signals. In some embodiments, the second detection module detects at least one optical signal. The analysis module analyzes the signal from the first detection module to determine the level of an analyte (e.g., hemoglobin or any other analyte), and analyzes the signal from the second detection module to detect a group of target particles (e.g., leukocyte cells or any other target particles). In some embodiments, the control unit further includes an actuation module, which provides at least one actuation means to the cartridge device. One non-limiting example of the actuation means is a pneumatic pressure source that controls the transfer of the reagent or the sample mixture or both inside the cartridge device.

Figure 2B:
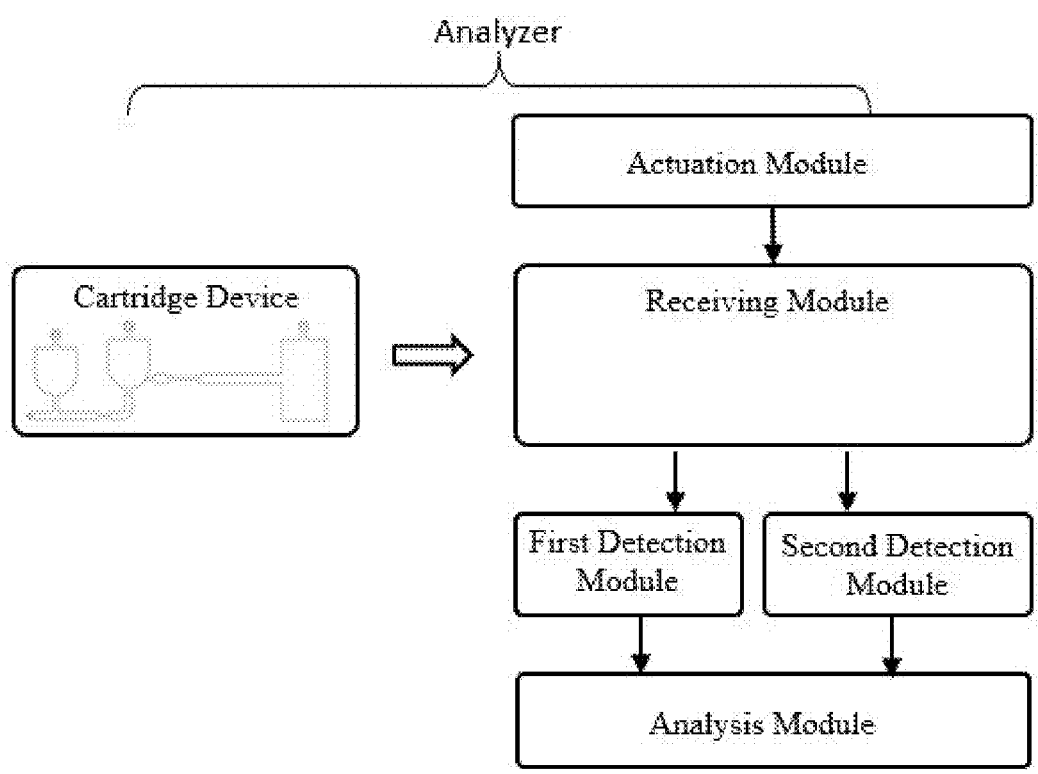
FIG. 2B illustrates an analyzer according to some embodiments of the disclosure.
Figure 2C:
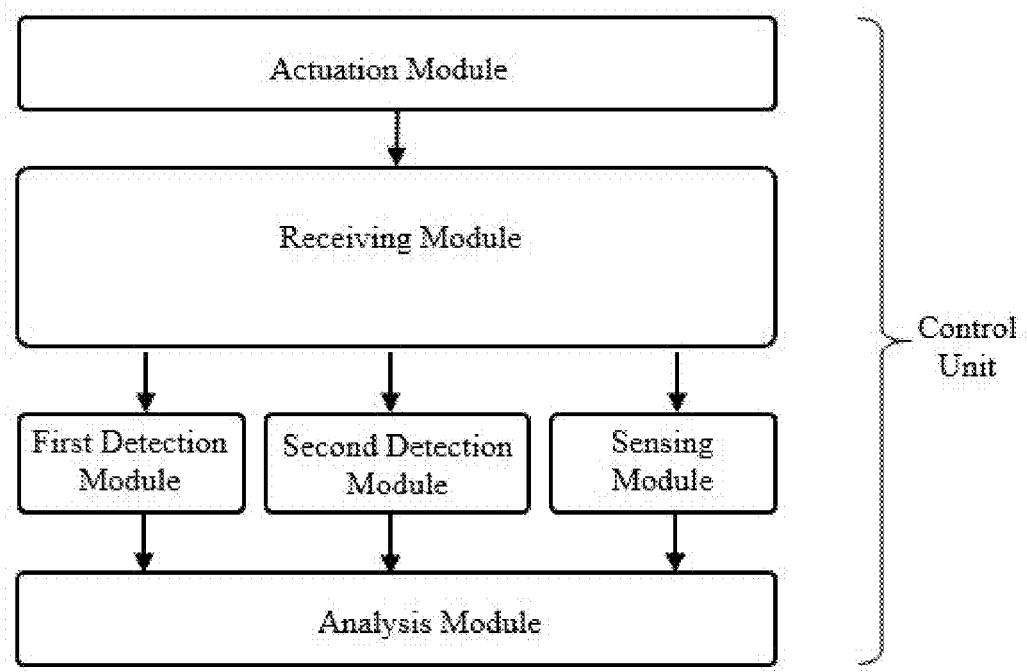
FIG. 2C illustrates a control unit device according to other embodiments of the disclosure.

In other non-limiting examples, as shown in FIG. 2C, the control unit device further includes a sensing module. The sensing module detects a sensing signal from a designated sensing area of the cartridge device to detect when a sample mixture enters or exits the sensing area. The analysis module further analyzes this signal to determine concentration of the target particles in the sample mixture.

Figure 2D:
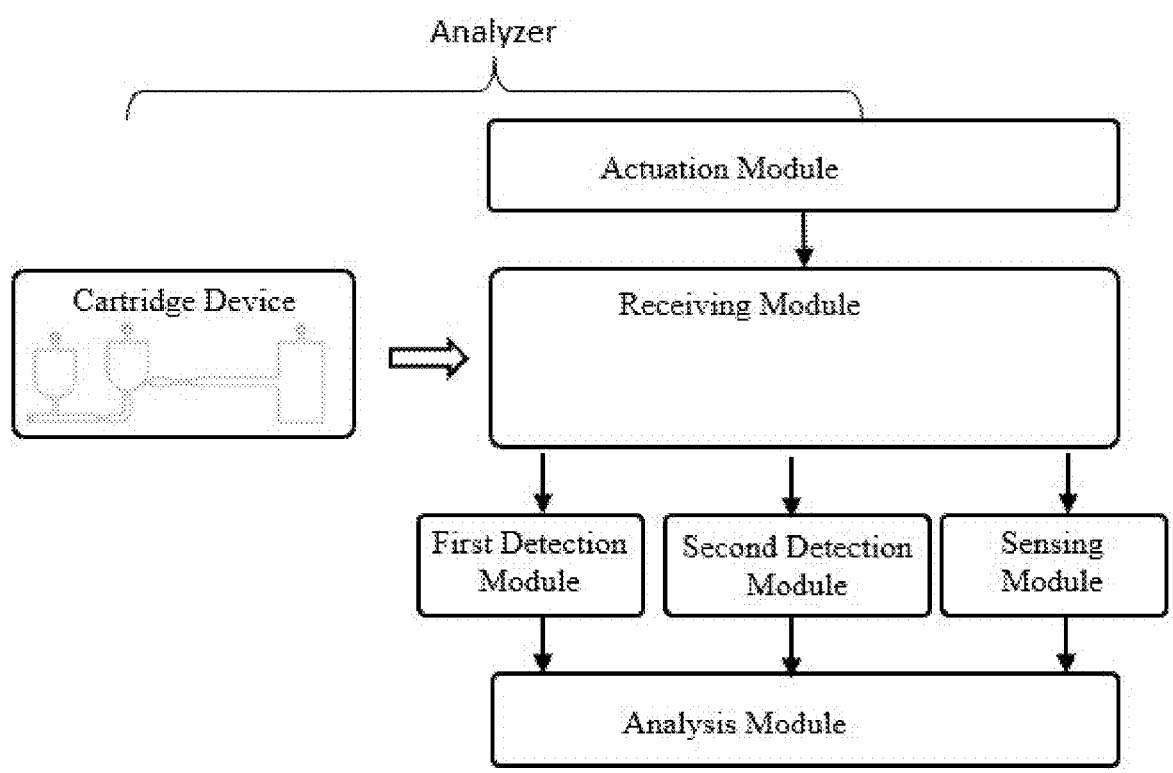
FIG. 2D illustrates an analyzer according to other embodiments of the disclosure.

Measurements of a sample are performed in an analyzer including a cartridge device and a control unit device, as illustrated by the block diagrams in FIG. 2B and FIG. 2D. To perform the measurements, a sample is applied to the cartridge device. A sample mixture is formed inside the cartridge from at least a portion of the sample and at least a portion of the reagent in the cartridge. In some embodiments, a collecting channel in the cartridge device collects at least a portion of the applied sample. In certain embodiments, the collecting channel collects a predetermined amount of the sample.

The sample may be applied to the cartridge device before or after it is received in the receiving module of the control unit device. In some embodiments, the sample is applied before the cartridge device is received in the receiving module. The reagent may be loaded into the cartridge device either before or after collecting the sample into the cartridge device. In some embodiments, the reagent is loaded into the cartridge before collecting the sample into the cartridge device, for example, during the manufacturing process of the cartridge device.

In some embodiments, at least a portion of the sample mixture is measured in the first detection area, where an optical signal is measured by the first detection module to determine the level of an analyte (e.g., hemoglobin or any other analyte). In some embodiments, at least a portion of the sample mixture is transferred into the second detection area to form a sample stream in the flow cell. A signal is measured by the second detection module from the sample stream to detect a group of target particles (e.g., leukocyte cells or any other types of particles).

In some embodiments, at least a portion of the sample mixture and a portion of a second reagent is mixed to form a second sample mixture. In certain embodiments, an optical signal is measured by the first detection module to measure the level of a second analyte in the first detection area. In certain other embodiments, a signal is measured by the second detection module to measure the level of a second analyte in the flow cell. In certain other embodiments, a signal is measured by the second detection module to detect a second group of target particles in the flow cell.

Figure 3A:
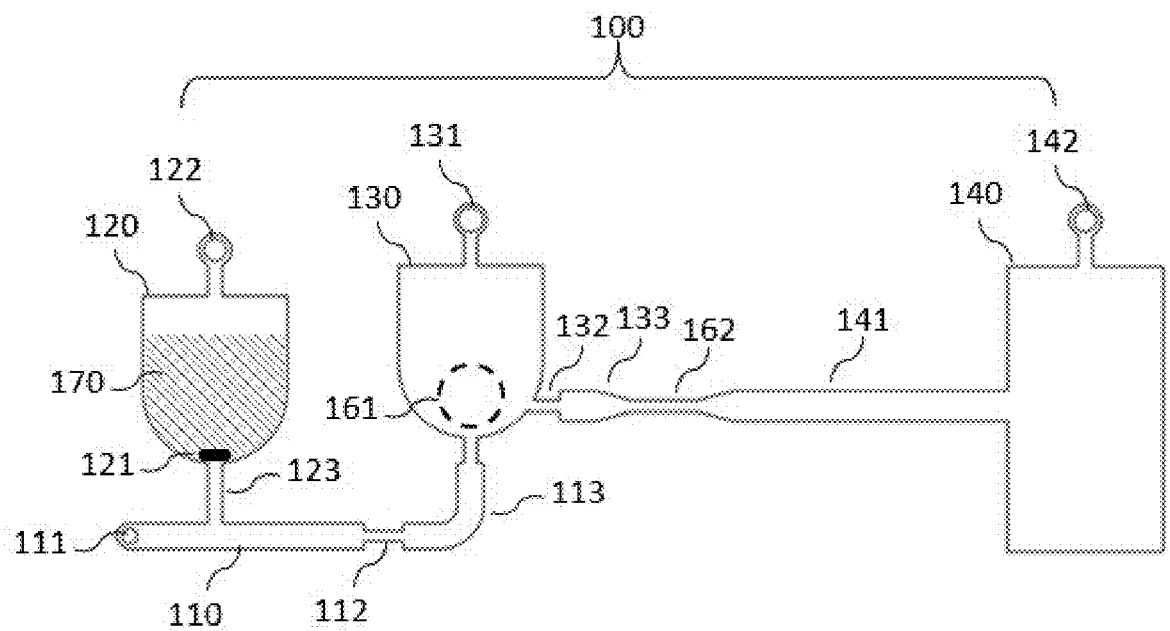
FIGS. 3A-3J illustrate a cartridge device for measuring analytes and target particles according to various embodiments of the disclosure.

FIG. 3A shows a non-limiting example of the cartridge device 100 for measuring an analyte (e.g. hemoglobin) and a group of particles (e.g., leukocyte cells) from a blood sample. This cartridge device includes a collecting channel 110, a reagent chamber 120, a mixing chamber 130, a first detection area 161 and a second detection area 162. In this example, the collecting channel 110 has an inlet port 111 for receiving a sample and is connected to the mixing chamber 130 by a fluid conduit 113. A reagent 170 is kept in the reagent chamber 120, which is connected to the mixing chamber 130 via the fluid conduit 123, the collecting channel 110 and the fluid conduit 113. The first detection area 161 is in the mixing chamber 130. The second detection area 162 includes a flow cell that is connected to the mixing chamber 130 via a fluid conduit 133.

Figure 3B:
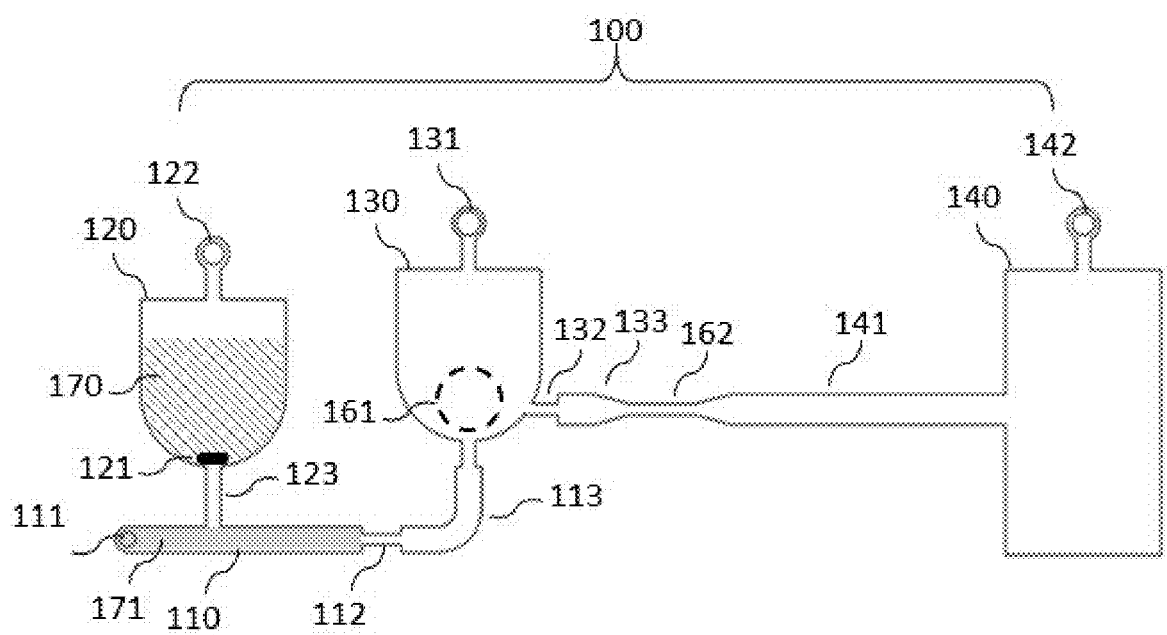

To receive a sample (e.g., a blood sample) into the cartridge, the sample is applied to the inlet 111 and at least a portion of the sample 171 is received into the collecting channel 110, as shown in FIG. 3B. In this example, the collecting channel 110 has a hydrophilic surface, and the sample is drawn into the channel by capillary action of the hydrophilic surface. The collecting channel 110 further includes a stop valve 112 (e.g., a capillary stop valve), which stops the capillary action to collect a pre-determined volume of the sample. Examples of the stop valve include but are not limited to a channel segment having a hydrophobic surface. The inlet 111 is sealed after the collected sample reaches the position of the stop valve 112 in the collecting channel.

Figure 3C:
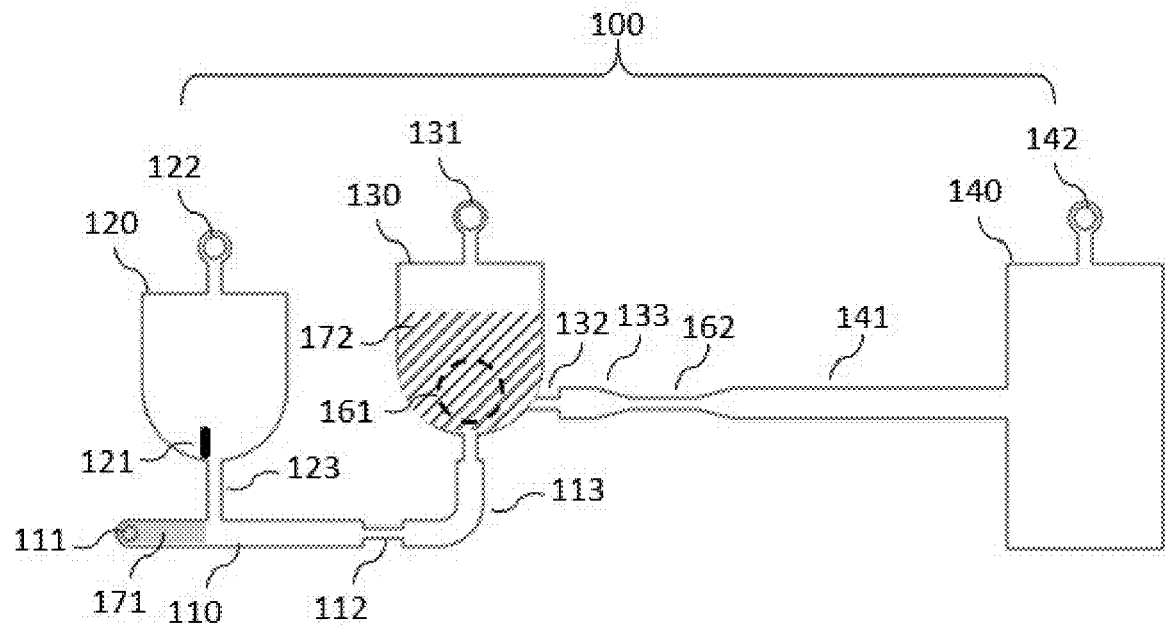

After the sample collection, the reagent 170 and at least a portion of the collected sample 171 are transferred into the mixing chamber 130 to form a sample mixture 172, as shown in FIG. 3C. In this example, the reagent chamber 120 further includes a valve component 121, which is initially in closed status to prevent the reagent 170 from leaving the reagent chamber 120. After the sample collection, the valve 121 is opened to connect the chamber 120 to the fluid conduit 123. The chamber 120 further include a pneumatic port 122. By providing a pneumatic pressure source at the port 122 as an actuation means, the reagent 170 is transferred from the reagent chamber 120 into the fluid conduit 123, and further transferred together with a portion of the sample 171 into the mixing chamber 130 to form a sample mixture 172.

FIG. 4A and FIG. 4B show a non-limiting example of the valve component 121, which includes a bendable membrane 126, a rigid substrate 124, and a breakable seal 125. The breakable seal 125 holds the membrane to the substrate 124, as shown in FIG. 4A, so that it prevents the reagent 170 in the reagent chamber 120 from entering the fluid conduit 123. To open the valve, as shown in FIG. 4B, a mechanical force F is applied to bend the bendable membrane 126. This bending deformation causes the membrane 126 to separate away from the substrate 124, and creates a fluid path 127, through which the reagent 170 may be transferred into the fluid conduit 123. In this example, the mechanical bending force F is applied as an actuation means by the actuation module of the control unit device to the cartridge device to open the valve.

Figure 3D:
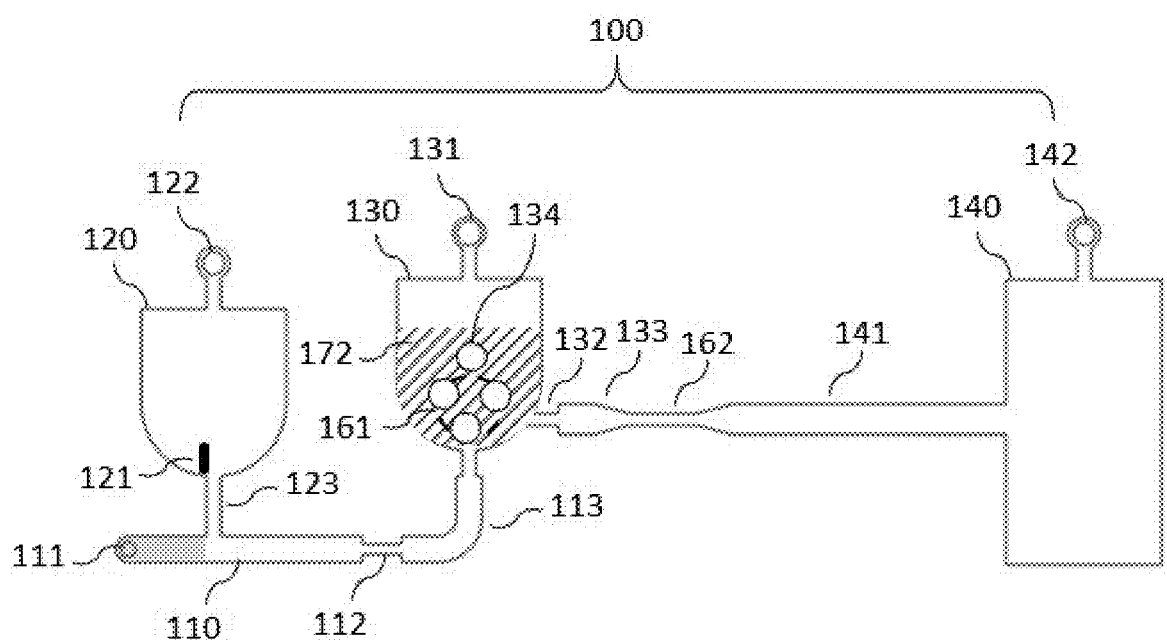

In some embodiments of the cartridge device, air bubbles 134 may be introduced into the sample mixture 172 to enhance the mixing, as shown in FIG. 3D. Air bubbles flow into the sample mixture 172 and introduce chaotic flow patterns that accelerate the mixing of the reagent and the sample. Means to introduce air bubbles include but are not limited to continuously applying a pneumatic pressure at the port 122 to generate bubbles at the interface of the fluid conduit 113 and the mixing chamber 130. The mixing chamber 130 may further include a venting port 131, which is connected to the atmosphere pressure to release excessive air in the mixing chamber, which includes but is not limited to the air introduce by the air bubbles. The chamber 130 may further includes an outlet component 132, which connects to the fluid conduit 133. The outlet component 132 prevents the sample mixture 172 from entering the fluidic conduit 133, until an actuation means is applied to the cartridge device to transfer the sample mixture for measurement in the second detection area 162. Examples of the outlet component 132 include but are not limited to a capillary stop valve, which includes a narrow channel with a hydrophobic surface.

In the sample mixture 172, the reagent 170 lyses erythrocyte cells in the blood sample and releases hemoglobin from the erythrocyte cells. In this example, the reagent 170 includes a hemolytic agent, which is an ionic surfactant. Examples of the ionic surfactant include but are not limited to quaternary ammonium salts, pyridinium salts, long-chain ethoxylated amines and alkyl sulfates. The reagent 170 further includes a fluorescent labeling agent (e.g., a fluorescent dye) that selectively labeling leukocyte cells. Examples of the fluorescent dye include but are not limited to Propidium Iodide, Thiazole Orange, DAPI (4',6-diamidino-2-phenylindole), Acridine Orange, Basic Orange 21, and polymethine dyes as described in U.S. Pat. No. 6,004,816.

In this example, the reagent 170 may further include a leukocyte protective agent, which is a non-ionic surfactant. Examples of the non-ionic surfactant include but are not limited to saponin, 2-phenoxyethanol, Triton X-100, Brij35, BC30TX (polyoxyethylene 30 cetyl ether), or other polyoxyethylene series nonionic surfactant. The reagent 170 may further include a hemoglobin stabilizing agent. Examples of the stabilizing agent include not are limited to EDTA (ethylenediaminetetraacetic acid), sodium or potassium salts of EDTA, and Tiron. The reagent 170 may further include an organic acid or its salt. Examples of the organic acid or its salt include but are not limited to benzoic acid, phthalic acid, hippuric acid, or a salt of any of these acids. The reagent may further include a buffer. Examples of the buffer include but are not limited to citrate buffer, HEPES or phosphate buffer.

In this example, the reagent 170 is in the form of one liquid solution in the cartridge device. In other embodiments, the reagent may be in the form of one liquid solution and dried powder of compounds. As a non-limiting example, one liquid solution including water may be kept in the chamber 120 and dried powder of the reagents may be kept in the mixing chamber 130. Both liquid solution and the dried powder are mixed with the sample in the chamber 130 to form the sample mixture.

Figure 3E:
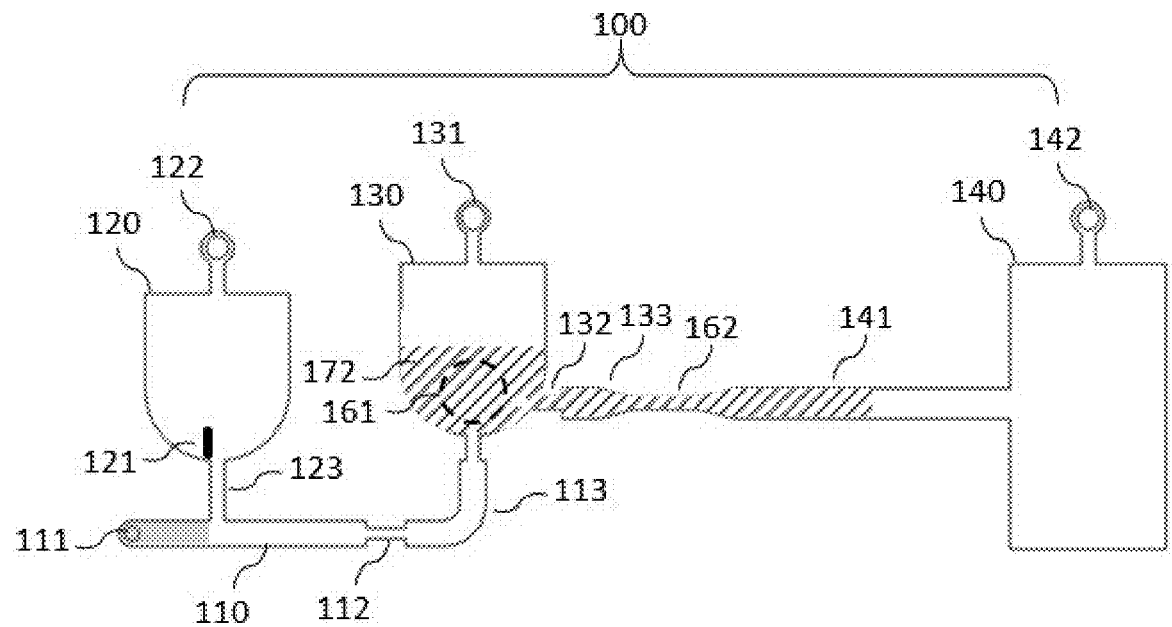

To detect an analyte (e.g., hemoglobin), at least a portion of the sample mixture 172 is measured in the first detection area 161, as shown in FIG. 3E. In this example, the first detection area 161 is in the mixing chamber 130, and includes two optically transparent areas 135 and 136 in parallel, as shown in FIG. 5A. An incident light $I_0$ is directed to the area 135, and the transmission light $I1$ exiting the area 136 is detected by the first detection module of a control unit device. The amount of the light absorption, which is the difference between the incident light and the transmitted light, is used to determine the hemoglobin concentration. FIG. 5B shows another example of the first detection area, which includes only one transparent area 137. The incident light $I0$ is directed on the area 137, reflected by the area 138 and further reflected by the area 139. The transmitted light $I1$ existing the surface 137 is detected to determine the hemoglobin concentration.

Figure 6A:
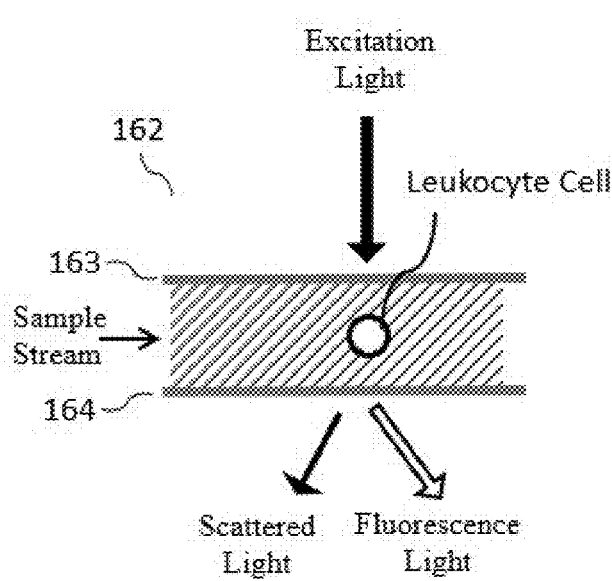
FIG. 6A and FIG. 6B illustrate a flow cell according to some embodiments of the disclosure.
Figure 6B:
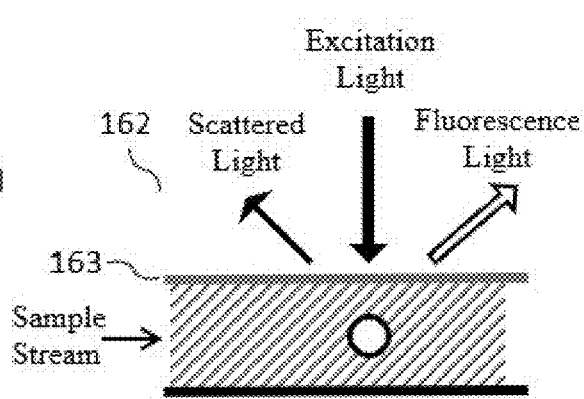

To detect a first group of target particles (e.g., leukocyte cells), at least a portion of the sample mixture 172 is transferred into the flow cell of the second detection area 162 to form a sample stream for measurements, as shown in FIG. 3E. In this example, the flow cell of the second detection area 162 includes at least two transparent areas, 163 and 164, as shown in FIG. 6A. An excitation light is directed to the area 163, and the scattered light and the fluorescent light existing the area 164 are measured by the second detection module of the control unit device to detect leukocyte cells. In another example, the flow cell of the second detection area 162 may include only one transparent area 163, as shown in FIG. 6B. In these embodiments, the scatted light and the fluorescent light existing the area 163 are measured by the second detection module.

In this example, the cartridge device may further include a fluid conduit 141 connecting to the downstream of the second detection area 162, as shown in FIG. 3E. This fluid conduit 141 further connects to a waste chamber 140. The waste chamber 140 includes a pneumatic port 142. To transfer sample mixture 172 from the mixing chamber 130 to the second detection area 162, a pneumatic pressure source is connected to the port 142 as an actuation means, which provides a pneumatic pressure lower than the atmosphere pressure, while the port 131 is connected to the atmosphere pressure. This pneumatic pressure difference draws the sample mixture from 130 to pass the outlet 132, to enter the fluid conduit 133 and further into the flow cell of the second detection area 162. The sample mixture exiting the second detection area enters the fluid conduit 141. Any excessive sample leaving the conduit 141 is collected in the waste chamber 140.

Figure 3F:
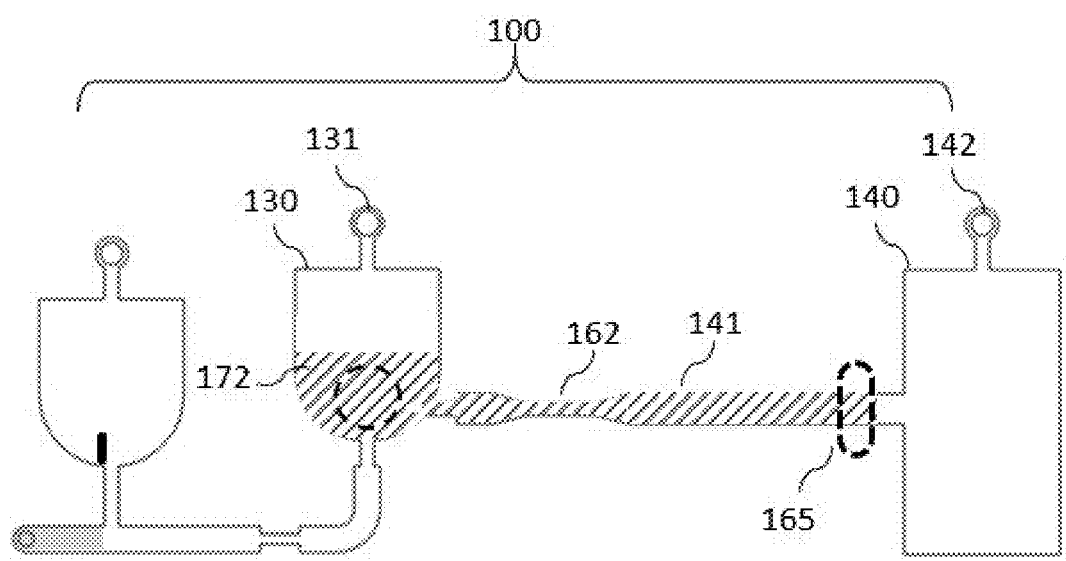

In another embodiment of this example, a sensing signal may be further detected at a designated location 165 on the fluid conduit 141, as shown in FIG. 3F. This sensing signal detects when any sample mixture enters or exits the location 165. This sensing signal is detected by the sensing module and analyzed by the analysis module of the control unit device. This sensing signal is analyzed to determine the volume of the sample mixture that has been measured in the flow cell. The analysis module may count the number of the target particles (e.g., leukocyte cells) using the signal detected in the second detection module. using the number of the target particles and the volume of the sample mixture, the analysis module may further determine the concentration of the target particles in the sample mixture (e.g., the concentration of leukocyte cells in the first sample mixture). A non-limiting example of the sensing signal is an infrared light transmitted through the fluid conduit 141. The intensity of transmitted infrared light changes between presence and absence of the sample mixture at the location 165. More examples of the sensing signal, the sensing module, and the method of how to determine the volume of the sample mixture and the concentration of the target particles may be found in the U.S. Patent Application Nos. 62/497,075 and 62/425,395, which are incorporated herein by reference in their entireties.

In some embodiments, the sample may be added to the cartridge device without the collecting channel. As a non-limiting example, the sample may be added into to the mixing chamber 130 by pipetting through the venting port 131.

Figure 7A:
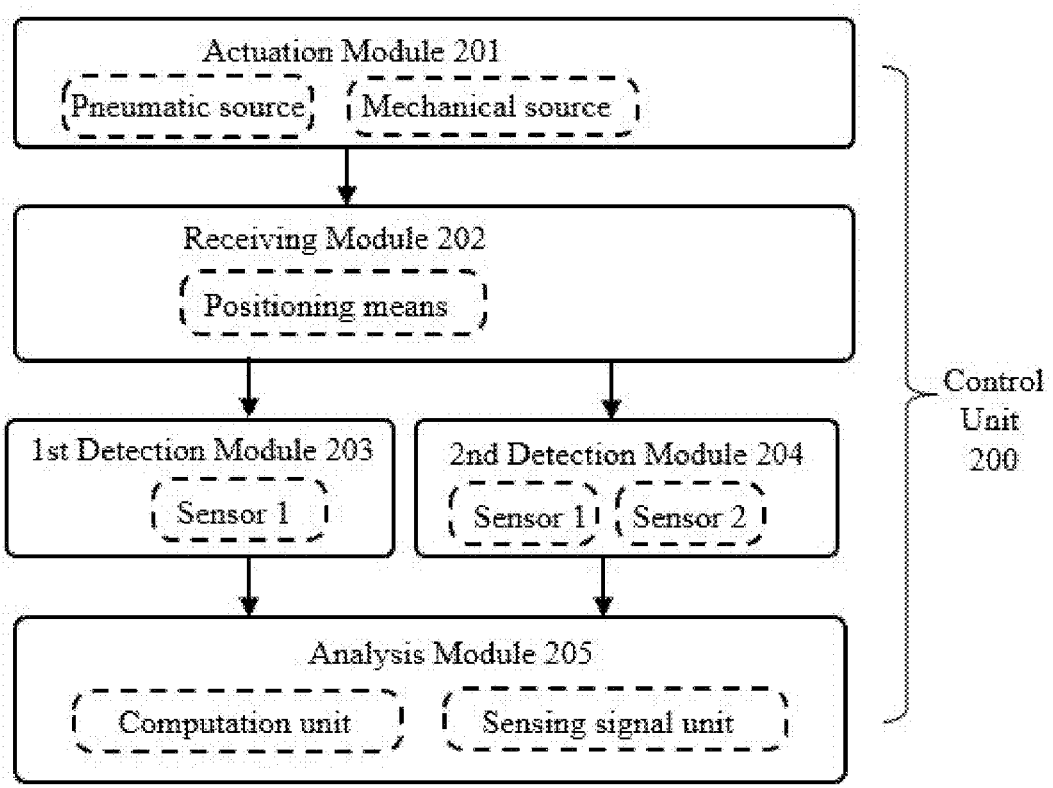
FIGS. 7A-7B illustrate a control unit device according to some embodiments of the disclosure.

A non-limiting example of the control unit device for use with the cartridge device is illustrated by the block diagram in FIG. 7A. An analyzer including the cartridge device 100 and the control unit device 200 is used to measure an analyte (e.g., hemoglobin) and a group of target particles (e.g., leukocyte cells) in a biological sample (e.g., a blood sample). The control unit device 200 includes a receiving module 202, an actuation module 201, a first detection module 203, a second detection module 204, and an analysis module 205.

The receiving module 202 include at least one positioning means. After the blood sample is applied to the cartridge device, the receiving module 202 takes in the cartridge and uses the positioning means to align the cartridge device with the detection modules 203 and 204 for signal measurements. One non-limiting example of the positioning means is a stationary mechanical structure. The shape of the mechanical structure mates with the shape of the cartridge device to constrain the cartridge device in a designated position. Another non-limiting example of the positioning means includes a linear translation stage, a camera and an alignment mark. The camera images the position of the cartridge device and the alignment mark, and sends the image signal to the linear translation stage. The linear translation stage receives the image signal, moves the cartridge device towards the alignment mark, and stops when the cartridge device overlaps with the alignment mark.

The actuation module 201 includes at least one pneumatic pressure source and at least one mechanical force source as actuation means. The actuation module 201 applies mechanical force to the cartridge device 100 to open the valve component 121. The actuation module further applies pneumatic pressure to the port 122 to drive the reagent and at least a portion of the collected sample for mixing. The pneumatic pressure is further applied to the port 122 to introduce air bubbles to enhance the mixing as shown in FIG. 3D. In some embodiments, the pneumatic pressure applied to the port 122 further alternates between a pressure higher and a pressure lower than the atmosphere, so that it transfers the sample mixture 172 between chamber 120 and 130 back and forth. The actuation module 201 further applies the pneumatic pressure to the port 142, and transfers at least a portion of the sample mixture 172 to form a sample stream in the flow cell of the second detection area 162.

In this non-limiting example, the first detection module includes at least one sensor, which measures the signals of the transmitted light from sample mixture in the first detection area 161. The second detection module 204 includes at least two sensors: one for measuring the signals of scattered light from the second detection area 162 and the other for measuring fluorescent light from the second detection area 162. The measurement in the first detection module and the measurement in the second detection module may be performed at the same time or one after another. In some embodiments, firstly, the first detection module measures a signal from at least a portion of the sample mixture in the first detection area to detect the hemoglobin, and secondly, the second detection module measures a signal from the sample stream in the second detection area to detect the leukocyte cells. In various embodiments, firstly, the second detection module measures a signal from the sample stream in the second detection area to detect the leukocyte cells, and secondly, the first detection module measures a signal from at least a portion of the sample mixture in the first detection area to detect the hemoglobin. In certain embodiments, the measurement in the first detection module is performed after the measurement in the second detection unit, so that the sample mixture has a longer incubation time to lyze the erythrocyte cells.

The analysis module 205 includes a computation module. The computation module analyzes the signals from the first detection module to detect the hemoglobin concentration. In a non-limiting example, it compares the level of light absorption to a calibration curve to determine the hemoglobin concentration. FIG. 7C compares the hemoglobin concentrations measured by the analyzer with a reference device (HemoCue Hb201+ system), and the comparison shows high linearity (Y=0.9958X) and high correlation (correlation coefficient $R^2$=0.9964). The computation module also analyzes the signals from the second detection module to detect the leukocyte cells. In a non-limiting example, it detects the signal peaks in the fluorescent light to count the number of the leukocyte cells. The computation module further uses the detected peaks in the fluorescent light and scattered light to identify the leukocyte cells into subpopulations, which include but are not limited to lymphocytes, monocytes, neutrophils, eosinophils, and basophils. FIG. 7D shows a non-limiting example of the scatter plot, where each dot is one leukocyte cell being detected and the position of the dot is determined by the peak heights of the fluorescent light and scatted light signals. The scatter plot distinguishes the detected leukocyte cells into clusters related to lymphocytes, monocytes, neutrophils, and eosinophils.

Figure 7B:
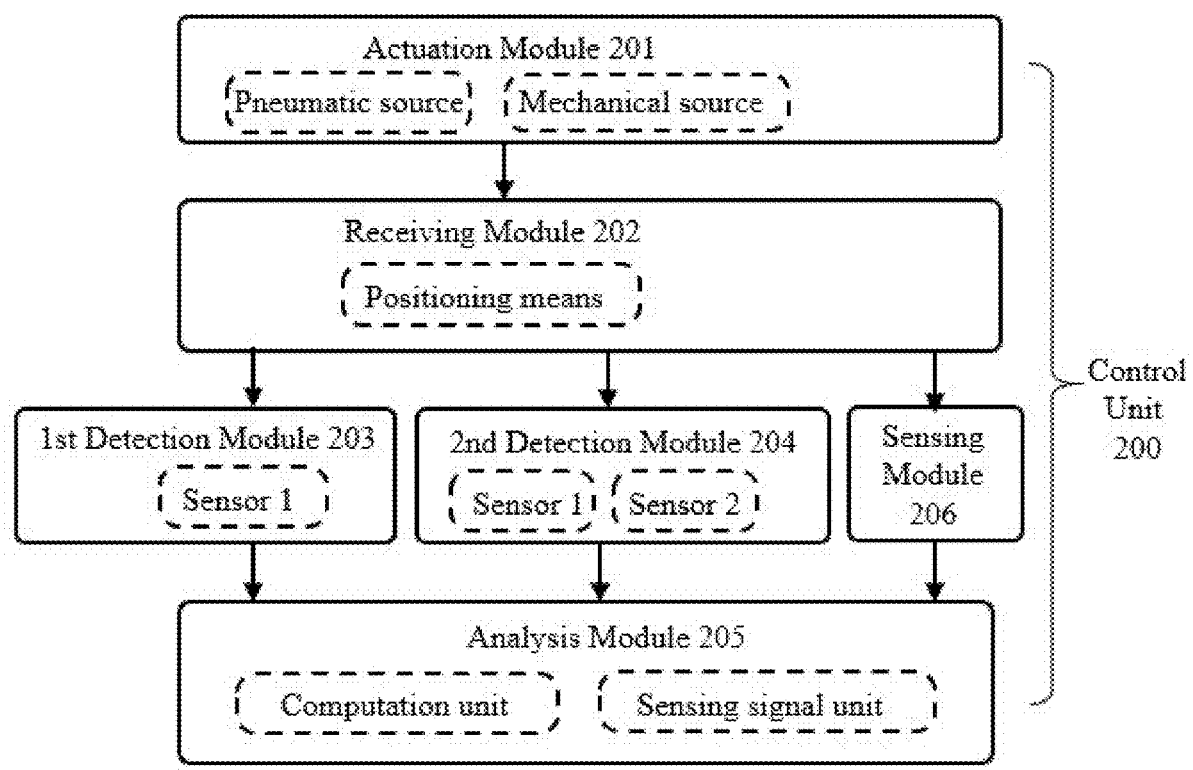
Figure 7C:
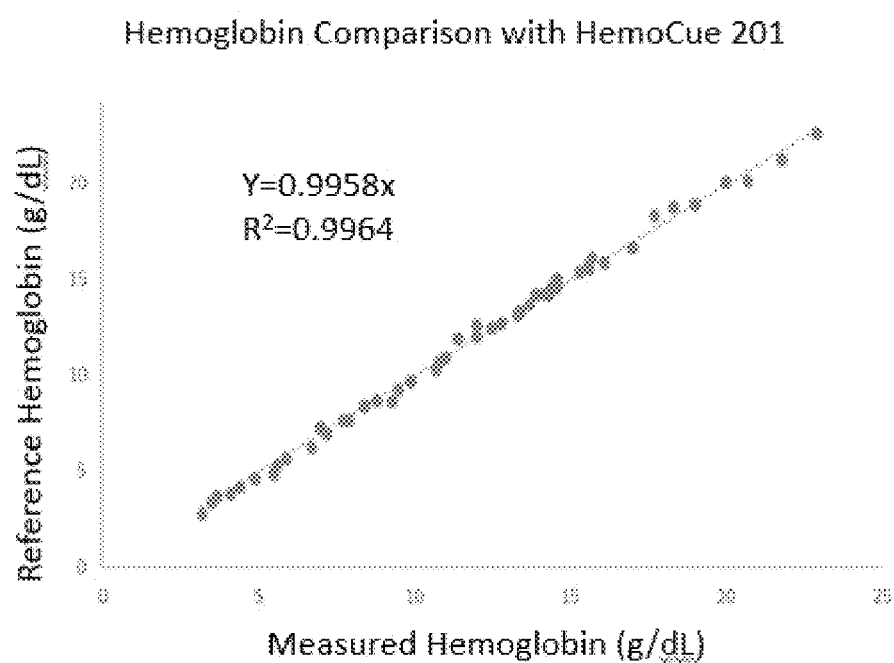
FIG. 7C illustrates a comparison between the hemoglobin concentrations measured by an analyzer according to some embodiments of the disclosure and those according to a reference device (HemoCue Hb201+ system).
Figure 7D:
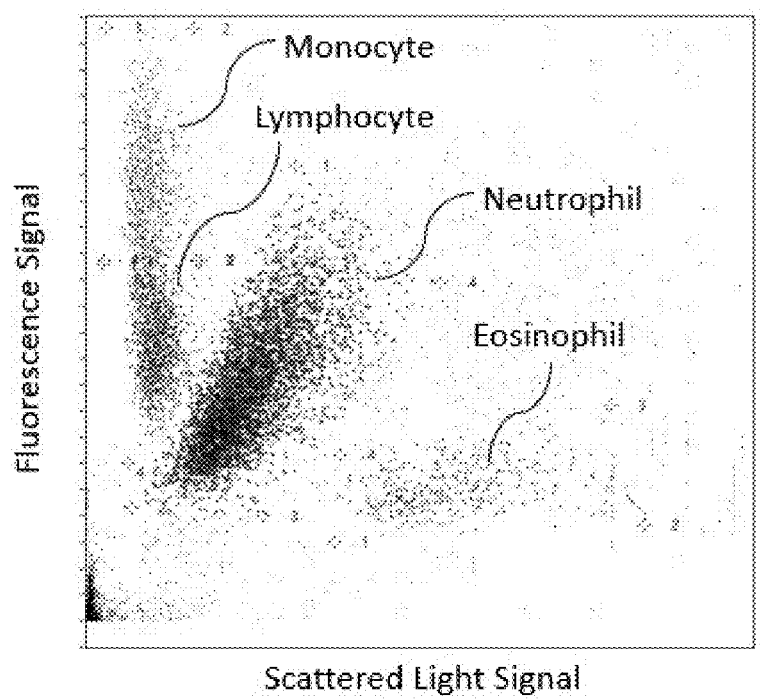
FIG. 7D illustrates a scatter plot of leukocytes according to some embodiments of the disclosure.

In some embodiments, the control unit device 200 further includes a sensing module 206, as shown in FIG. 7B, which detects the sensing signal from the location 165 of the cartridge device 100. The analysis module further uses this signal to determine the volume of the sample mixture measured in the flow cell. Examples of how to use this signal to determine the volume of the sample mixture measured in the flow cell include but are not limited to the methods described in U.S. Patent Applications 62/497,075 and 62/425,395, which are incorporated herein by reference in their entireties. The computation unit further calculates the concentration or absolute count of the leukocyte cells by dividing the number of the leukocyte cells with the sample volume.

Figure 3G:
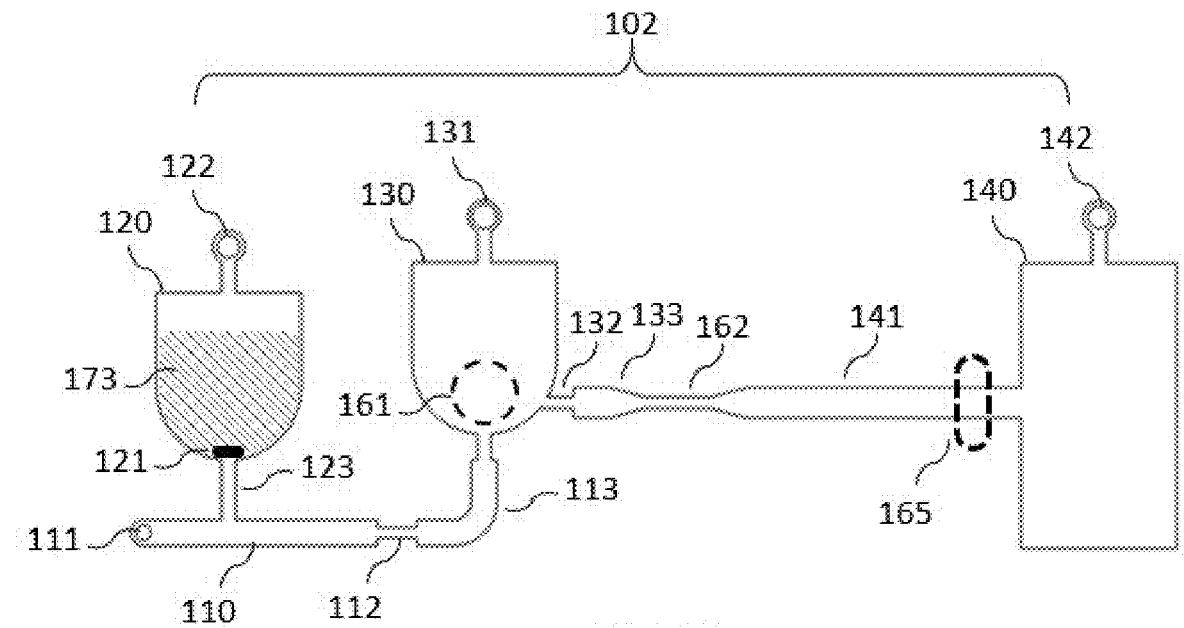

FIG. 3G shows another non-limiting example of the cartridge device, which may be used for detecting an analyte (e.g., hemoglobin) and a group of target particles (e.g., CD4+ lymphocyte cells). In this cartridge device 102, the reagent 173 includes a hemolytic agent, which is ammonium chloride, and further includes a fluorescent labeling agent, which is a fluorophore-conjugated antibody specific for CD4 surface antigens on lymphocyte cells (e.g., human CD4 Alexa Fluor 488-conjugated antibody from R&D Systems). After collecting a blood sample in the collecting channel 110, the cartridge device 102 is received into a control unit device of FIG. 7B to perform measurements. The reagent 173 mix with the sample to form a sample mixture in the mixing chamber 130. The ammonium chloride lyses erythrocyte cells in the sample to release hemoglobin, and the fluorophore-conjugated antibody binds to CD4+ lymphocyte cells to introduce fluorescent labeling. The control unit device measures light absorption from the first detection area to determine the concentration of hemoglobin in the sample mixture. Additionally, the control unit device measures fluorescent signal from the flow cell to detect the CD4+ lymphocyte cells in the sample stream. Similar to the measurements of leukocyte cells, the control unit devices may analyze the fluorescent signal to count the number of the CD4+ lymphocyte cells. Furthermore, by analyzing the sensing signal from the designated sensing area 165, the concentration of the CD4+ lymphocyte cells in the sample mixture may be determined.

Figure 3H:
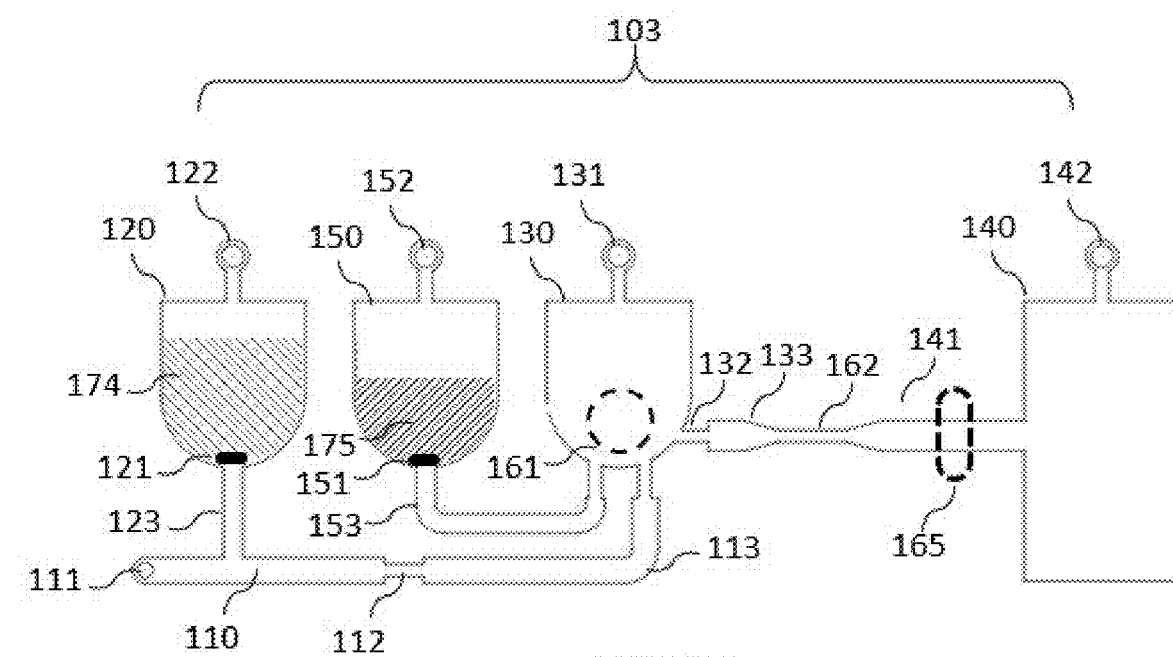

FIG. 3H shows another non-limiting example of the cartridge device, which may be used for detecting a first analyte (e.g., hemoglobin) and a first group of target particles (e.g., leukocyte cells), and a second analyte (e.g., C-reactive protein). In this example, the cartridge device 103 includes a first reagent chamber 120 and a second reagent chamber 150. The second reagent chamber 150 includes a valve 151 and is connected to the mixing chamber 130 via a fluid conduit 153. The first reagent chamber 120 contains a first reagent 174, which includes a non-ionic surfactant (e.g., saponin) as a hemolytic agent and a fluorescent dye as a fluorescent labeling agent. The second reagent chamber 150 contains a second reagent 175, which includes particles coated with antibodies specific for C-reactive protein (e.g., the antibody-coated particles in the QuikRead go CRP test kit from Orion Diagnostica).

Figure 3I:
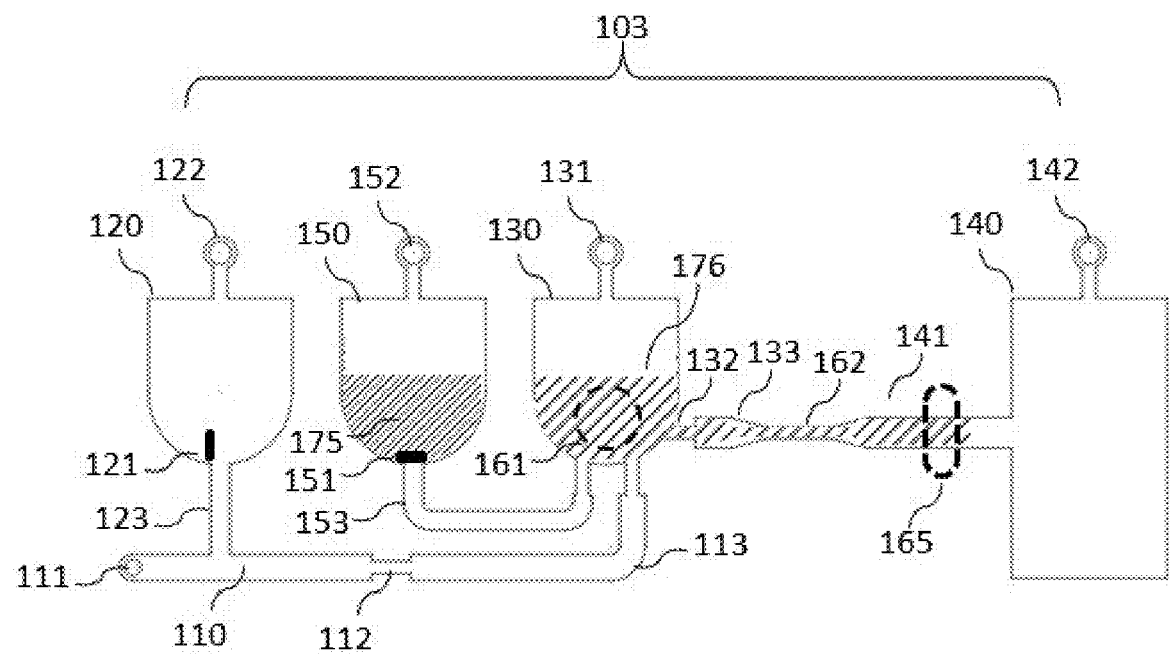

After applying a blood sample to the collecting channel 110, the cartridge device 103 is received into a control unit device of FIG. 7B to perform measurements. The first reagent 174 is mixed with the sample to form a first sample mixture 176 in the mixing chamber 130. As shown in FIG. 3I, the control unit device measures a light absorption signal from the first sample mixture 176 in the first detection area 161 to detect the first analyte (e.g., hemoglobin concentration; see non-limiting examples of results as shown in FIG. 7C). Additionally, at least a portion of the first sample mixture 176 is transferred to the flow cell of the second detection area 162 and the control unit device measures a signal of fluorescent light and a signal of scattered light from the flow cell to detect the first group of target particles (e.g., leukocyte cells; see non-limiting examples of results as shown in FIG. 7D).

Figure 3J:
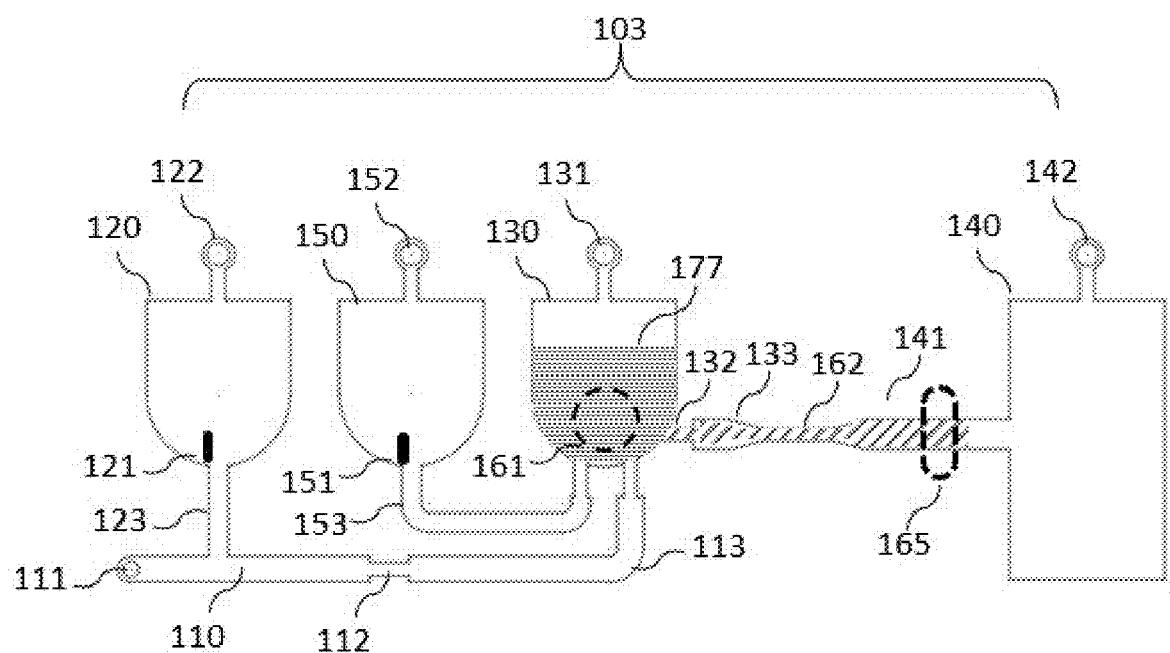
Figure 7E:
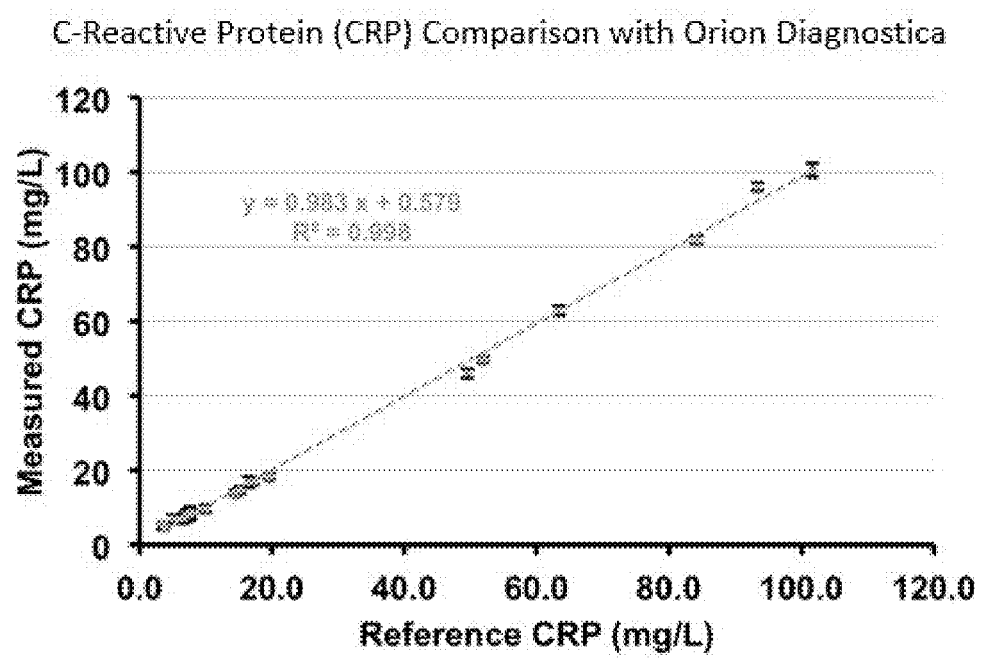
FIG. 7E illustrates a comparison between the C-reactive protein concentrations measured by a method according to some embodiments of the disclosure and those according to a reference method (Fast CRP test on QuikRead Go instrument from Orion Diagnostica).

After these two measurements, as shown in FIG. 3J, the valve 151 of the second reagent chamber 150 is opened, and the second reagent 175 is transferred via the fluid conduit 153 into the mixing chamber 130, where it mixes with the first sample mixture 176 to form a second sample mixture 177. The control unit device further measures a light absorption signal from the first detection area 161 to detect the second analyte (e.g., concentration of the C-reactive protein). Non-limiting examples of results are shown in FIG. 7E, which compares the measurement results with a reference method (Fast CRP test on QuikRead go analyzer from Orion Diagnostica). The comparison shows high linearity (Y=0.993X+0.579) and high correlation (correlation coefficient R2=0.998).

FIG. 3A to FIG. 3J are non-limiting embodiments of the cartridge device described in the FIG. 1. Any other embodiments of the cartridge device may be used for measurements of analytes (e.g., hemoglobin) and target particles (e.g., leukocyte cells) in a sample. US Patent Applications Nos. 62/497,075 and 62/425,395 have provided various designs of the fluidic structures, chemicals and methods of using these structures and chemicals, which may be used in the cartridge device. U.S. Patent Applications No. 62/497,075 and 62/425,395 are incorporated herein by reference in their entireties.

The cartridge device is to be received in a control unit device to measure the sample. Therefore, there are size limitations on the cartridge device. In some embodiments, the cartridge device occupies a space in range of about 0.1 to 1 $cm^3$, 1 to 5 $cm^3$, 5 to 25 $cm^3$, 25 to 50 $cm^3$, or 50 to 200 $cm^3$.

The collecting channel in the cartridge may be of any type of design. In some embodiments, the collecting channel needs a rotation motion to connect to the mixing chamber. Examples of the rotating design of the collecting channel includes but are not limited to the examples described in U.S. Pat. No. 7,771,658, which is incorporated herein by reference in its entirety. In some embodiments, the collecting channel is stationary in the cartridge device. Examples of the stationary collecting channel include but are not limited to the exemplar design as shown in FIG. 3A, in which the collecting channel has a fixed position in the cartridge device.

The collecting channel in the cartridge device may be of any size and is used to collect any amount of sample. In some embodiments, the collecting channel has a cross section that is small enough to induce capillary action. In certain embodiments, the collecting channel has a cross section area in the range of about 0.01 to 0.1 $mm^2$, 0.1 to 1 $mm^2$, or 1 to 5 $mm^2$. In some embodiments, at least a portion of the surface of the collecting channel is hydrophilic to introduce the capillary action. In some embodiments, the collecting channel holds a sample of about 0.1 to 1 µL, 1 to 5 µL, 5 to 10 µL, 10 to 20 µL or 20 to 50 µL.

At least a portion of the collected sample is mixed with the reagent in the cartridge device to form a sample mixture. The reagent dilutes the sample in the sample mixture, and the dilution may be of any desired ratio. The dilution ratio is chosen to be large enough to minimize the possibility of multiple leukocyte cells being detected as one in the second detection area, and small enough to maximize the signal level being detected from the sample mixture in the first detection area. In some embodiments, the dilution ratio between the reagent and the sample in the sample mixture is about 10:1 to 30:1, 30:1 to 60:1, 60:1 to 80:1, 80:1 to 100:1, 100:1 to 200:1, or 200:1 to 500:1.

The reagent in the cartridge device may be of any volume. In some embodiments, reagent volume should be small enough to be kept inside the cartridge device, and sufficient for measurement of one sample. In certain embodiments, the volume of the reagent is in the range of about 10 to 100 µL, 100 to 300 µL, 300 to 600 µL, 600 to 1000 µL or 1000 to 2000 µL. Accordingly, the volume of the regent chamber is about 20 to 200 µL, 200 to 600 µL, 600 to 1200 µL, 1200 to 2000 µL or 2000 to 2500 µL.

At least one area of the first detection area is optically transparent. The optically transparent area has a sufficient transmission rate for light in the wavelength range of about 500 to 600 nm. In some embodiments, the transmission rate is in the range of about 60% to 80%, 80% to 90%, 90% to 99%, or 99% to 100%. In some embodiments, at least one optical signal is measured from the sample mixture. Examples of the optical signal include not are limited to light absorption, light extinction, light transmission, light reflection, light scattering, and surface plasmon resonance. The total distance that the light has traveled in the sample mixture is called the optical path length. In some embodiments, the optical path length should be large enough to maximize the signal, while small enough to minimize the size of the cartridge. In certain embodiments, the optical path length is in the range of about 0.01-0.1 mm, 0.1-0.2 mm, 0.2-1 mm, 1-5 mm, 5-10 mm, or 10-20 mm.

Leukocyte cells are detected in the second detection area by a measurement means. The signal detected by the measurement means could be any type of signals, which include but are not limited to electrical signals, optical signals, or both. In some embodiments, the second detection area includes a flow cell, which has at least one optically transparent area. The optically transparent area has a sufficient transmission rate for light in the wavelength range of about 440 to 650 nm. In some embodiments, this transmission rate is about 60% to 80%, 80% to 90%, 90% to 95%, or 95% to 100%. In some embodiments, at least one optical signal is detected by the measurement means. Examples of the optical signals include but not are limited to transmitted light, reflected light, scattered light, light extinction, light absorption, fluorescent light, and white light image, or any combinations of these signals. In some embodiments, at least one signal of a fluorescent light is measured.

The flow cell could be of any size. In some embodiments, the size of the flow cell is big enough to allow leukocyte cells to flow through without blockage and small enough to minimize the possibility of multiple leukocyte cells being detected as one. In certain embodiments, the sizes of the flow cell have cross section areas in the range of about 200 to 900 $\mu m^2$, 900 to 1800 $\mu m^2$, 1800 $\mu m^2$ to 3600 $\mu m^2$, 3600 to 6400 $\mu m^2$, 6400 to 40000 $\mu m^2$. In some embodiments, there is no sleeving or sheath flow around the sample stream in the flow cell. A sleeving or sheath flow is a flow of a buffer solution other than the sample mixture itself. In other words, the sample stream is in direct contact with the flow cell.

The reagent or the first reagent in this cartridge device may include at least one hemolytic agent, which lyses erythrocyte cells in the blood sample to release hemoglobin into the sample mixture. In some embodiments, the hemolytic agent is an ionic surfactant. Examples of the ionic surfactants include but are not limited to quaternary ammonium salts, pyridinium salts, long-chain ethoxylated amines and alkyl sulfates. The hemoglobin in the sample mixture may be measured by optical signals. Examples of the optical signal include but are not limited to light absorption at a wavelength between 450 nm and 600 nm.

In some embodiments, the reagent or the first reagent in the cartridge device may not include a hemolytic agent. The reagent dilutes erythrocyte cells in the sample without hemolysis. Example of the reagent include but not are limited to isotonic buffers such as phosphate-buffered saline (PBS). The hemoglobin in the sample mixture may be measured by optical signals. A non-limiting example is to measure the transmitted light at two wavelengths, one between 490 nm and 520 nm and the other between 650 nm and 1200 nm. Examples of methods to detect the hemoglobin without hemolysis are described in the U.S. Pat. No. 6,831,733, which is incorporated herein by reference in its entirety.

In some embodiments, the reagent or the first reagent further includes at least a staining agent (e.g., a dye chemical) that selectively stains leukocyte cells. The staining agent includes at least one dye chemical that binds to leukocyte cells. In some embodiments, after binding to leukocyte cells, the dye chemical either changes color or changes the color of the leukocyte cells. Examples of the dye chemical that changes color after binding to leukocyte cells include but are not limited to Peroxide Oxide and Chlorazol Black. In various embodiments, the dye chemical either shifts the fluorescence wavelength, or increases the fluorescence quantum efficiency, or increases the fluorescence intensity, or changes other optical properties after binding to leukocyte cells. Examples of the dye chemical that changes fluorescence or other optical properties include but are not limited to fluorescent dyes selected from the following group: Propidium Iodide, Thiazole Orange, DAPI (4',6-diamidino-2-phenylindole), Acridine Orange, Basic Orange 21, and polymethine dyes described in U.S. Pat. No. 6,004,816. In some embodiments, the concentration of the dye chemical in the reagent is in the range of about 0.01 ppm to 0.1 ppm, 0.1 ppm to 1 ppm, 1 ppm to 10 ppm, or 10 ppm to 100 ppm. In some embodiments, the pH level of the reagent is between 5 and 10.

In some embodiments, the reagent is stored in the form of a liquid solution in the cartridge device. In other embodiments, the reagent is stored in the form of a liquid solution and a dried powder of compounds. The dried powder and the liquid solution are both mixed with the sample to form the sample mixture. In some embodiments, it is advantageous to store the liquid solution and the dried powder of the reagent separately on the cartridge device. As a non-limiting example, the reagent includes at least one ionic surfactant as the hemolytic agent. When the ionic surfactant is stored in the liquid solution form, it is susceptible to bubbles generated by shaking movements of the cartridge device during transportation. By keeping the ionic surfactant as a dried powder, the risk of generating bubbles in the reagent is minimized.

The cartridge device may use various actuation means to transfer the reagent into the mixing chamber to form the sample mixture, and examples of the actuation means include but are not limited to pneumatic pressure, centrifugal force, magnetic force, mechanical force, and electrophoresis. In some embodiments, the cartridge device receives a pneumatic pressure as the actuation means to transfer the reagent. The cartridge device may further use different means to keep the reagent in the reagent chamber before the mixing. In some embodiments, the regent chamber includes a valve component that prevents the reagent from leaving the chamber before the mixing. Examples of the valve component include but are not limited to mechanical valve, electrical valve, magnetic valve, and adhesive seals, et cetera. Before mixing, the cartridge device receives an actuation means to open the valve component. Non-limiting examples of the design of the storage chamber, the valve component and the actuation means are described in U.S. Patent Application No. 62/504,866, which is incorporated herein by reference in its entirety.

The cartridge device may use various actuation means to transfer the sample mixture into the flow cell of the second detection area, and examples of the actuation means include but are not limited to pneumatic pressure, centrifugal force, magnetic force, mechanical force, and electrophoresis. In some embodiments, the cartridge device receives a pneumatic pressure as the actuation means to transfer the sample mixture. In some embodiments, the mixing chamber further includes a port that is opened to the atmosphere pressure or an ambient pressure for venting pneumatic pressure. The ambient pressure is the air pressure of the environment where the device is being used. Non-limiting examples of the design of the mixing chamber and the actuation means to transfer the sample mixture is described in the U.S. Patent Application No. 62/497,075, which is incorporated herein by reference in its entirety.

The first detection module measures at least one optical signal from the sample mixture. The measured optical signal may be of any type. Examples of the optical signal include but are not limited to light absorption, light extinction, light transmission, light refection, light scattering, and surface plasmon resonance. In some embodiments, the first detection module measures light absorption of at least one wavelength between 470 nm and 600 nm. In various embodiments, the first detection module measures light absorptions of at least two wavelengths: the first wavelength is between 470 nm and 600 nm and the second wavelength is between 650 nm and 1200 nm.

The second detection module measures at least one signal from the second detection area. Examples of the signal include but are not limited to optical signals, electrical signals, and imaging signals. In some embodiments, the second detection module measures at least one optical signal, and the optical signal may be transmitted light, reflected light, scattered light, fluorescent light, light extinction, light absorption, or other types of optical signals. In some embodiments, the second detection module measures at least one signal of fluorescent light from the sample stream. In some embodiments, the second detection module measures at least one signal of fluorescent light and at least one signal of scattered light from the sample stream.

The analysis module analyzes the signal from the first detection module to determine the hemoglobin level, which includes but is not limited to the hemoglobin concentration. The analysis module analyzes the signal from the second detection module to determine the level of the leukocyte cells, which includes but is not limited to leukocyte count and leukocyte differential. In some embodiments, the analysis module further identifies the leukocyte cells into subpopulations, which include but are not limited to lymphocytes, monocytes, neutrophils, eosinophils, and basophils, et cetera. In some embodiments, the analysis module may detect additional sensing signals from the cartridge device. In some embodiments, the analysis module may detect a sensing signal from the cartridge device to determine the volume of the sample mixture measured in the flow cell (see e.g., FIG. 3F).

In some embodiments, the control unit device may further include an actuation module. The actuation module provides at least one actuation means to the cartridge device. The actuation means could be any of type, examples of which include but are not limited to pneumatic pressure, centrifugal force, magnetic force, electrophoresis, and mechanical force, et cetera. In some embodiments, the actuation module provides at least one pneumatic pressure to the cartridge device. In some embodiments, the actuation module provides at least one mechanical force to the cartridge device.

In some embodiments, there is no liquid interaction or exchange between the cartridge device and the control unit device. The types of the liquid include but are not limited to the sample, the reagent, and the sample mixture. In some embodiments, the control unit device does not receive liquid from the cartridge device. In some embodiments, the control unit device does not transfer liquid into the cartridge device. In some embodiments, the control unit device neither receives liquid from the cartridge device nor transfers liquid into the cartridge device. In other embodiments, there is liquid interaction or exchange between the cartridge device and the control unit device. In a non-limiting example, the control unit device transfer liquid, e.g. the reagent, into the cartridge device for the measurement.

Many variations and alternative elements have been disclosed in embodiments of the present disclosure. Still further variations and alternate elements will be apparent to one of skill in the art. Among these variations, without limitation, are the selection of fluidic units, components and structures for the inventive devices and methods, and the samples that may be analyzed therewith. Various embodiments of the disclosure may specifically include or exclude any of these variations or elements.

In some embodiments, the numbers expressing quantities of ingredients, properties such as concentration, reaction conditions, and so forth, used to describe and claim certain embodiments of the disclosure are to be understood as being modified in some instances by the term "about." As one non-limiting example, one of ordinary skill in the art would generally consider a value difference (increase or decrease) no more than 10% to be in the meaning of the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclosure may contain certain errors necessarily resulting from the standard deviation found in their respective testing measurements.

Groupings of alternative elements or embodiments of the disclosure disclosed herein are not to be construed as limitations. Each group member may be referred to and claimed individually or in any combination with other members of the group or other elements found herein. One or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

The disclosure is explained by various examples, which are intended to be purely exemplary of the disclosure, and should not be considered as limiting the disclosure in any way. Various examples are provided to better illustrate the claimed disclosure and are not to be interpreted as limiting the scope of the disclosure. To the extent that specific materials are mentioned, it is merely for purposes of illustration and is not intended to limit the disclosure. One skilled in the art may develop equivalent means or reactants without the exercise of inventive capacity and without departing from the scope of the disclosure.

The various methods and techniques described above provide a number of ways to carry out the application. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, may be employed in various combinations by one of ordinary skill in this art to perform methods in accordance with the principles described herein. Among the various elements, features, and steps some will be specifically included, and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans may employ such variations as appropriate, and the application may be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entireties for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the disclosure are not limited to that precisely as shown and described.

Various embodiments of the disclosure are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the disclosure known to the applicant at this time of filing the application has been presented and is intended for the purposes of illustration and description. The present description is not intended to be exhaustive nor limit the disclosure to the precise form disclosed and many modifications and variations are possible in the light of the above teachings. The embodiments described serve to explain the principles of the disclosure and its practical application and to enable others skilled in the art to utilize the disclosure in various embodiments and with various modifications as are suited to the particular use contemplated. Therefore, it is intended that the disclosure not be limited to the particular embodiments disclosed for carrying out the disclosure.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure.

Aspects of the subject matter described herein may be useful alone or in combination with any one or more of the other aspects described herein. Without limiting the foregoing description, in a first aspect of the present disclosure, a cartridge device for measuring an analyte and/or a target particle in a sample includes: a reagent chamber configured for accommodating a reagent; a mixing chamber configured for mixing at least a portion of the sample with at least a portion of the reagent to form a sample mixture; a first detection area including an optically transparent area. The first detection area is configured for measuring the analyte in the sample mixture; and a second detection area including a flow cell. The flow cell is configured for forming a sample stream of at least a portion of the sample mixture and the second detection area is configured for measuring the target particle in the sample stream.

In accordance with a second aspect of the present disclosure, which may be used in combination with any other aspect or combination of aspects listed herein, the flow cell is a sheathless flow cell and configured for forming the sample stream without a sleeving or sheath flow.

In accordance with a third aspect of the present disclosure, which may be used in combination with any other aspect or combination of aspects listed herein, the flow cell includes an optically transparent area configured for measuring an optical signal from the target particle in the sample stream.

In accordance with a fourth aspect of the present disclosure, which may be used in combination with any other aspect or combination of aspects listed herein, the first detection area is configured to have an optical path length in the range of about 0.01-0.1 mm, 0.1-0.2 mm, 0.2-1 mm, 1-5 mm, 5-10 mm, or 10-20 mm.

In accordance with a fifth aspect of the present disclosure, which may be used in combination with any other aspect or combination of aspects listed herein, a cartridge device as described herein further includes a collecting channel configured for collecting a predetermined volume of the sample.

In accordance with a sixth aspect of the present disclosure, which may be used in combination with any other aspect or combination of aspects listed herein, at least a portion of the collecting channel is hydrophilic. The sample is collected into the collecting channel by capillary action. The collecting channel further includes a stop valve configured for stopping the capillary action to collect a predetermined sample volume.

In accordance with a seventh aspect of the present disclosure, which may be used in combination with any other aspect or combination of aspects listed herein, the reagent chamber further includes a valve component.

In accordance with an eighth aspect of the present disclosure, which may be used in combination with any other aspect or combination of aspects listed herein, the valve component is configured to be opened by an actuation means to connect the reagent chamber with the mixing chamber for mixing the sample and the reagent.

In accordance with a ninth aspect of the present disclosure, which may be used in combination with any other aspect or combination of aspects listed herein, the valve component includes a breakable seal. The breakable seal is configured to be opened by a mechanical force to connect the reagent chamber with the mixing chamber for mixing the sample and the reagent.

In accordance with a tenth aspect of the present disclosure, which may be used in combination with any other aspect or combination of aspects listed herein, the reagent includes a hemolytic agent that lyses erythrocytes.

In accordance with an eleventh aspect of the present disclosure, which may be used in combination with any other aspect or combination of aspects listed herein, the hemolytic agent includes an ionic surfactant, and/or a non-ionic surfactant, and/or ammonium chloride.

In accordance with a twelfth aspect of the present disclosure, which may be used in combination with any other aspect or combination of aspects listed herein, the reagent includes a fluorescent staining agent that selectively stains the target particle.

In accordance with a thirteenth aspect of the present disclosure, which may be used in combination with any other aspect or combination of aspects listed herein, the fluorescent staining agent includes a fluorescent dye and/or a fluorophore-conjugated antibody.

In accordance with a fourteenth aspect of the present disclosure, which may be used in combination with any other aspect or combination of aspects listed herein, a cartridge device as described herein further includes a pneumatic port configured for interfacing with a pneumatic pressure source, and the pneumatic pressure source is configured for transferring the reagent, and/or the sample, and/or the sample mixture inside the cartridge device.

In accordance with a fifteenth aspect of the present disclosure, which may be used in combination with any other aspect or combination of aspects listed herein, the mixing chamber includes a venting port connected to either an ambient pressure or an atmosphere pressure.

In accordance with a sixteenth aspect of the present disclosure, which may be used in combination with any other aspect or combination of aspects listed herein, a cartridge device as described herein further includes a fluid conduit connected to the flow cell. The fluid conduit includes a designated sensing area configured for measuring a sensing signal to detect when a sample mixture enters or exits the designated sensing area.

In accordance with a seventeenth aspect of the present disclosure, which may be used in combination with any other aspect or combination of aspects listed herein, a cartridge device as described herein further includes a second reagent chamber configured for accommodating a second reagent.

In accordance with an eighteenth aspect of the present disclosure, which may be used in combination with any other aspect or combination of aspects listed herein, the reagent chamber and the second reagent chamber are both connected to the mixing chamber.

In accordance with a nineteenth aspect of the present disclosure, which may be used in combination with any other aspect or combination of aspects listed herein, the mixing chamber is configured to mix at least a portion of the sample mixture with at least a portion of the second reagent to form a second sample mixture.

In accordance with a twentieth aspect of the present disclosure, which may be used in combination with any other aspect or combination of aspects listed herein, an analyzer for measuring an analyte and/or a target particle in a sample includes: a cartridge device as described herein and a control unit device, which includes: a receiving module configured for receiving the cartridge device to interact with the control unit device; a first detection module configured for measuring a signal from the first detection area; a second detection module configured for measuring a signal from the flow cell of the second detection area; and an analysis module configured for analyzing the signal from the first detection module to measure the analyte and analyzing the signal from the second detection module to measure the target particle.

In accordance with a twenty-first aspect of the present disclosure, which may be used in combination with any other aspect or combination of aspects listed herein, the first detection module is configured for detecting a light signal having a wavelength in the range of about 470-600 nm, and/or a light signal having a wavelength in the range of about 650-1200 nm.

In accordance with a twenty-second aspect of the present disclosure, which may be used in combination with any other aspect or combination of aspects listed herein, the second detection module is configured for detecting an optical signal. The optical signal includes scattered light, transmitted light, reflected light, fluorescent light, light extinction, light absorption, or white light image, or a combination thereof.

In accordance with a twenty-third aspect of the present disclosure, which may be used in combination with any other aspect or combination of aspects listed herein, an analyzer as described herein further includes a sensing module for measuring a sensing signal to detect when a sample mixture enters or exits a designated sensing area of the cartridge device.

In accordance with a twenty-fourth aspect of the present disclosure, which may be used in combination with any other aspect or combination of aspects listed herein, the analysis module is further configured for analyzing the sensing signal to determine the concentration of the target particle.

In accordance with a twenty-fifth aspect of the present disclosure, which may be used in combination with any other aspect or combination of aspects listed herein, a method for measuring an analyte and/or a target particle in a sample includes: applying a sample to a cartridge device as described herein; transferring the cartridge device into a control unit device; and using the cartridge device and the control unit device to measure the analyte and/or the target particle.

In accordance with a twenty-sixth aspect of the present disclosure, which may be used in combination with any other aspect or combination of aspects listed herein, the control unit device detects a light signal from the first detection area to measure the analyte.

In accordance with a twenty-seventh aspect of the present disclosure, which may be used in combination with any other aspect or combination of aspects listed herein, the control unit device detects an optical signal from the flow cell to measure the target particle. The optical signal includes scattered light, transmitted light, reflected light, fluorescent light, light extinction, light absorption, or white light image, or a combination thereof.

In accordance with a twenty-eighth aspect of the present disclosure, which may be used in combination with any other aspect or combination of aspects listed herein, a method as described herein further includes mixing at least a portion of the sample and at least a portion of a reagent inside the cartridge device to form a sample mixture.

In accordance with a twenty-ninth aspect of the present disclosure, which may be used in combination with any other aspect or combination of aspects listed herein, mixing the sample and the reagent includes generating bubbles in the sample mixture in the cartridge device.

In accordance with a thirtieth aspect of the present disclosure, which may be used in combination with any other aspect or combination of aspects listed herein, the sample applied to the cartridge device is a blood sample.

In accordance with a thirty-first aspect of the present disclosure, which may be used in combination with any other aspect or combination of aspects listed herein, the control unit device measures the sample mixture in the flow cell to detect the target particle. The target particle includes cells, blood cells, leukocytes, or beads, or a combination thereof.

In accordance with a thirty-second aspect of the present disclosure, which may be used in combination with any other aspect or combination of aspects listed herein, the control unit device measures the sample mixture in the first detection area to detect the analyte. The analyte includes hemoglobin, or C-reactive protein, or a combination thereof.

In accordance with a thirty-third aspect of the present disclosure, which may be used in combination with any other aspect or combination of aspects listed herein, a method as described herein further includes mixing at least a portion of the sample mixture with at least a portion of a second reagent inside the cartridge device to form a second sample mixture.

In accordance with a thirty-fourth aspect of the present disclosure, which may be used in combination with any other aspect or combination of aspects listed herein, the control unit device further measures the second sample mixture in the flow cell to detect a second target particle.

In accordance with a thirty-fifth aspect of the present disclosure, which may be used in combination with any other aspect or combination of aspects listed herein, the control unit device further measures the second sample mixture in the first detection area to detect a second analyte.

In accordance with a thirty-sixth aspect of the present disclosure, which may be used in combination with any other aspect or combination of aspects listed herein, the control unit device further measures a sensing signal from a designated sensing area of the cartridge device to determine the concentration of the target particle.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A cartridge device for measuring at least one item in a sample, the at least one item being selected from the group consisting of an analyte and a target particle in a sample, the cartridge device comprising:
  a reagent chamber configured for accommodating a reagent;
  a mixing chamber configured for mixing at least a portion of the sample with at least a portion of the reagent to form a first sample mixture;
  a first detection area comprising an optically transparent area, wherein the first detection area is configured for measuring the analyte in the first sample mixture;
  a second detection area comprising a flow cell, wherein the flow cell is configured for forming a sample stream of at least a portion of the first sample mixture and the second detection area is configured for measuring the target particle in the first sample mixture; and
  a fluid conduit connected to the flow cell, wherein the fluid conduit comprises a designated sensing area configured for measuring a sensing signal to detect when a sample mixture enters or exits the designated sensing area.

2. The cartridge device of claim 1, wherein the flow cell is a sheathless flow cell and configured for forming the sample stream without a sheath flow.

3. The cartridge device of claim 1, wherein the flow cell comprises an optically transparent area configured for measuring an optical signal from the target particle in the sample stream.

4. The cartridge device of claim 1, further comprising a collecting channel configured for collecting a predetermined volume of the sample.

5. The cartridge device of claim 1, wherein the reagent chamber further comprises a valve component.

6. The cartridge device of claim 1, wherein the reagent comprises a hemolytic agent that lyses erythrocytes.

7. The cartridge device of claim 1, wherein the reagent comprises a fluorescent staining agent that selectively stains the target particle.

8. The cartridge device of claim 1, further comprising a pneumatic port configured for interfacing with a pneumatic pressure source, wherein the pneumatic pressure source is configured for transferring at least one article inside the cartridge device, the at least one article being selected from the group consisting of the reagent, the sample, and the first sample mixture.

9. The cartridge device of claim 1, wherein the mixing chamber comprises a venting port connected to an ambient pressure or an atmosphere pressure.

10. The cartridge device of claim 1, further comprising a second reagent chamber configured for accommodating a second reagent, wherein:
  the cartridge device is configured to form a second sample mixture with at least a portion of the first sample mixture and at least a portion of the second reagent and
  the cartridge device is further configured to measure an analyte from the second sample mixture in the first detection area, or a target particle from the second sample mixture in the second detection area.

11. An analyzer for measuring at least one item in a sample, the at least one item being selected from the group consisting of an analyte and a target particle, the analyzer comprising:
the cartridge device of claim 1 and a control unit device, wherein the control unit device comprises:
a receiving module configured for receiving the cartridge device to interact with the control unit device;
a first detection module configured for measuring a signal from the first detection area;
a second detection module configured for measuring a signal from the flow cell of the second detection area; and
an analysis module configured for analyzing the signal from the first detection module to measure the analyte and analyzing the signal from the second detection module to measure the target particle.

12. A method for measuring at least one item in a sample, the at least one item being selected from the group consisting of an analyte and a target particle, the method comprising:
applying a sample to the cartridge device of claim 1;
transferring the cartridge device into a control unit device;
mixing at least a portion of the sample and at least a portion of a reagent inside the cartridge device to form a first sample mixture; and
using the cartridge device and the control unit device to measure the at least one item.

13. The method of claim 12, wherein the control unit device detects a light signal from the first detection area to measure the analyte from the first sample mixture.

14. The method of claim 12, wherein the control unit device detects an optical signal from the flow cell to measure the target particle; and wherein the optical signal comprises scattered light, transmitted light, reflected light, fluorescent light, light extinction, light absorption, white light image, or a combination thereof.

15. The method of claim 12, wherein the sample applied to the cartridge device is a blood sample.

16. The method of claim 12, wherein the control unit device measures the first sample mixture in the flow cell to detect the target particle, and wherein the target particle comprises cells, blood cells, leukocytes, beads, or a combination thereof.

17. The method of claim 12, wherein the control unit device further measures a sensing signal from a designated sensing area of the cartridge device to determine a concentration of the target particle.

18. The method of claim 12, further comprising:
mixing at least a portion of the first sample mixture with at least a portion of a second reagent inside the cartridge device to form a second sample mixture; and
measuring an analyte from the second sample mixture in the first detection area of the cartridge device, or a target particle from the second sample mixture in the second detection area of the cartridge device.

19. A cartridge device for measuring at least one item in a sample, the at least one item being selected from the group consisting of an analyte and a target particle in a sample, the cartridge device comprising:
a reagent chamber configured for accommodating a reagent;
a mixing chamber configured for mixing at least a portion of the sample with at least a portion of the reagent to form a first sample mixture;
a first detection area comprising an optically transparent area, wherein the first detection area is configured for measuring the analyte in the first sample mixture; and
a second detection area comprising a flow cell, wherein:
the flow cell is configured for forming a sample stream of at least a portion of the first sample mixture and the second detection area is configured for measuring the target particle in the first sample mixture; and
the flow cell is a sheathless flow cell and is configured for forming the sample stream without a sheath flow.

* * * * *